US005684881A

United States Patent [19]

Serikawa et al.

[11] Patent Number: 5,684,881

[45] Date of Patent: Nov. 4, 1997

[54] SOUND FIELD AND SOUND IMAGE CONTROL APPARATUS AND METHOD

[75] Inventors: Mitsuhiko Serikawa, Nishinomiya; Ryou Tagami; Akihisa Kawamura, both of Hirakata; Masaharu Matsumoto, Katano; Mikio Oda, Yawata; Hiroko Numazu, Kadoma, all of Japan

[73] Assignee: Matsushita Electric Industrial Co., Ltd., Osaka, Japan

[21] Appl. No.: 247,269

[22] Filed: May 23, 1994

[51] Int. Cl.$^6$ .............................. H04N 5/00; H04B 1/00

[52] U.S. Cl. .............................. 381/86; 381/1; 381/17

[58] Field of Search .............................. 381/17, 18, 24, 381/26, 86; 382/1

[56] References Cited

U.S. PATENT DOCUMENTS

| | | | |
|---|---|---|---|
| 4,219,696 | 8/1980 | Kogure | 179/1 G |
| 4,329,544 | 5/1982 | Kamada | 179/1 VE |
| 4,524,451 | 6/1985 | Watanabe | 381/1 |
| 4,975,954 | 12/1990 | Cooper | 381/1 |
| 5,040,219 | 8/1991 | Ando et al. | 381/61 |
| 5,572,591 | 11/1996 | Numazu et al. | 381/1 |

FOREIGN PATENT DOCUMENTS

| | | | |
|---|---|---|---|
| 0487181 | 5/1992 | European Pat. Off. | H04S 1/00 |
| 0553832 | 8/1993 | European Pat. Off. | H04S 1/00 |
| 403118000A | 5/1991 | Japan | 381/17 |
| 4-255200 | 9/1992 | Japan | H04S 1/00 |
| 406121306A | 4/1994 | Japan | 381/17 |

OTHER PUBLICATIONS

EPO Search Report (94108134.1) dated Oct. 24, 1994.

Y. Baba et al., "RSS System, Explanation of 3–dimensional Stereophonic Sound–Field Recording System", *JAS Journal*, pp. 1–5 (Sep. 1990). (Partial English Translation Provided).

*Primary Examiner*—Thomas D. Lee

*Assistant Examiner*—Jerome Grant, II

*Attorney, Agent, or Firm*—Ratner & Prestia

[57] ABSTRACT

The apparatus of the invention calculates filter coefficients for controlling sound field and sound image, based on a plurality of first impulse response signals and a pair of second impulse response signals. The plurality of first impulse response signals indicate impulse responses from loudspeakers reproducing audio signals to both ears of a listener. The pair of second impulse response signals indicate impulse responses from a reference loudspeaker at a position at which a sound image is localized to both ears of the listener. The apparatus includes: a feature extracting section for receiving the pair of second impulse response signals, for extracting parameters representing features of the pair of second impulse response signals, and for outputting parameter signals; a signal adjusting section for adjusting at least one of the plurality of first impulse response signals based on the parameter signals, and for outputting a pair of third impulse response signals having the same features as the extracted features; and a coefficient calculating section for calculating the filter coefficients for controlling the sound field and sound image, based on the plurality of first impulse response signals and the pair of third impulse response signals applied from the signal adjusting means.

20 Claims, 16 Drawing Sheets

300

$$L(n) = C_1(n)$$

$$\frac{F[L(n)]}{F[R(n)]} = \frac{F[T_1(n)]}{F[T_2(n)]}$$

$$T_1(n) = H_1(n) * C_1(n) + H_2(n) * C_3(n)$$

$$T_2(n) = H_1(n) * C_2(n) + H_2(n) * C_4(n)$$

SOUND FIELD AND SOUND IMAGE CONTROL APPARATUS AND METHOD

BACKGROUND OF THE INVENTION

1. Field of the Invention

The present invention relates to a sound field and sound image control apparatus and a sound field and sound image control method for performing audio reproduction with presence in audiovisual equipment. More particularly, the present invention relates to a filter coefficient calculating apparatus and a filter coefficient calculating method for performing the control sound field and sound image.

2. Description of the Related Art

Recently, movies and the like are more frequently enjoyed at home because the use of video tape recorders (VTRs) and the like is wide spread, so that even a small-scale audiovisual (AV) system for home use is desired to perform audio reproduction with presence. A private room in the house or the like generally involves limitations such as room space and equipment. In many cases, additional loudspeakers for sound control or surround-sound reproduction cannot be located in the rear and the side of a viewer. For such cases, a technique has been developed for performing stereophonic sound image control and sound field reproduction with presence only by using general 2 channels (2-ch) loudspeakers, or 2-ch loudspeakers accommodated in a TV set (for example, see JAS journal, September 1990).

A conventional sound field and sound image control apparatus using 2-ch reproducing loudspeakers will be described below.

FIG. 14 schematically shows a conventional sound field and sound image control apparatus 800 and a method for localizing the sound image in the left rear of a listener 86 by the conventional apparatus 800.

In the apparatus 800, sound source signals S(n) generated by a sound source 81 are processed by finite impulse response (FIR) filters 82-1 and 82-2, and then the processed signals are reproduced from a left-channel (L-ch) reproducing loudspeaker 83 and a right-channel (R-ch) reproducing loudspeaker 84, respectively. For the FIR filter 82-1, filter coefficients (impulse responses) H1(n) are set. For the FIR filter 82-2, filter coefficients H2(n) are set. In cases where the apparatus 800 is used for digital processing, an A/D (analog-to-digital) converter and a D/A (digital-to-analog) converter are required. For simplicity, such converters are omitted in the figure. The listener 86 stays at a position distant from the two loudspeakers 83 and 84 by equal distances (i.e., on the center line), and faces the front (i.e., faces toward the middle point between two loudspeakers).

In FIG. 14, C1(n) indicates an impulse response from the L-ch loudspeaker 83 at the position of the left ear of the listener 86 (to be more accurate, the position of the eardrum; and in the actual measurement, it is measured at the entrance of the auditory canal when an impulse is input to the loudspeaker 83). Similarly, C2(n) indicates an impulse response from the L-ch loudspeaker 83 at the position of the right ear of the listener 86, C3(n) indicates an impulse response from the R-ch loudspeaker 84 at the position of the left ear of the listener 86, and C4(n) indicates an impulse response from the R-ch loudspeaker 84 at the position of the right ear of the listener 86. In addition, T1(n) and T2(n) indicate impulse responses from a reference loudspeaker 85 to the left and right ears of the listener 86, respectively. The respective values of C1(n)–C4(n), T1(n) and T2(n) can be obtained by actual measurements or simulation.

These S(n), Ci(n) (i=1 to 4), T1(n), and T2(n) are represented as discrete-time signals with a finite length. That is, n actually means nT in which a certain short time (sampling time.) T is used as a unit. Herein, in order to provide the description in time domain, the impulse responses are used. For frequency domain, the same description as in the case of time domain can be expressed by using transfer functions obtained by Fourier-transforming the impulse responses.

With the above construction, if the sound source signals S(n) which are impulse signals are input, and they are reproduced from the L-ch reproducing loudspeaker 83 and the R-ch reproducing loudspeaker 84, the impulse response characteristic L(n) at the left-ear position of the listener 86 and the impulse response characteristic R(n) at the right-ear position (i.e., the head-related transfer functions in time domain ) are expressed as follows:

$$L(n)=H1(n)*C1(n)+H2(n)*C3(n) \quad (1)$$

$$R(n)=H1(n)*C2(n)+H2(n)*C4(n) \quad (2)$$

where the symbol * indicates a convolution.

In general, if two pairs of the head-related transfer functions are equal to each other, it may be assumed that each sound represented by the respective pair of transfer functions is perceived by the listener as coming from the same direction. Accordingly, if the filter coefficients H1(n) and H2(n) are set so that L(n) and R(n) become equal to T1(n) and T2(n), respectively, the listener 86 can feel (perceive) that the sound image is localized at the position of the reference loudspeaker 85, by reproducing the sound source signals S(n) with 2-ch loudspeakers located in front of the listener 86.

The above-mentioned convolution operation is performed by the FIR filters 82-1 and 82-2. FIG. 15 shows the basic construction of each of the FIR filters 82-1 and 82-2. As is shown in FIG. 15, the FIR filter has an input terminal 91 for inputting a signal, and N delay elements 92 each for delaying a signal by a time $\tau$ which are connected in series. On both ends of the series of delay elements 92, and between respective two delay elements 92, multipliers 93 are connected, respectively. Each multiplier 93 multiplies an input signal by a filter coefficient, which is referred to as a tap coefficient, and outputs the resultant signal to an adder 94. The signal obtained by the addition in the adder 94 is output from an output terminal 95.

In general, for such an FIR filter, a dedicated LSI such as a digital signal processor (DSP), which performs multiplication and addition at a high speed, is used. In the multipliers 93, the impulse responses h(i) (i=0, . . . , N) are set as the tap coefficients. A delay time $\tau$ corresponding to a sampling frequency at the conversion of an analog signal into a digital signal is set in the delay element 92. The multiplication and delay are repeatedly performed to input signals, and they are added to each other and then output. Thus the convolution operation is performed.

The above description is made for digital signals, so that, in the actual implementation, an A/D converter is required to convert an analog signal into a digital signal before inputting the signal to the FIR filter, and a D/A converter is required to convert the output digital signal into an analog signal. However, the converters are not shown in FIG. 15.

FIG. 16 shows a conventional exemplary device for calculating filter coefficients to localize a sound image. From the reproduction-system characteristics input terminals 901–904, signals corresponding to the reproduction-system impulse responses C1(n)–C4(n), which represent the characteristics of the reproduction system, are input, respectively. From the reference characteristics input terminals 905 and 906, signals corresponding to the impulse responses T1(n) and T2(n), which represent the reference characteristics, are input, respectively. These input impulse response signals are all input into a filter coefficient calculator 910.

When the impulse response signals of the reproduction-system (C1(n)–C4(n)) are applied, the filter coefficient calculator 910 calculates filter coefficients H1(n) and H2(n) for localizing a sound image (hereinafter referred to as sound image localization coefficients) so that the reference characteristics become the impulse responses T1(n) and T2(n) (specifically, a matrix operation is performed in the filter coefficient calculator 910). The filter coefficient calculator 910 calculates candidates H'1(n) and H'2(n) for H1(n) and H2(n) which satisfy the right sides of Equations (1) and (2) above. The calculated candidates H'1(n) and H'2(n) are output to a filter coefficient setting device 920 together with the reproduction-system impulse response signals C1(n)–C4 (n).

The filter coefficient setting device 920 sets the impulse responses H'1(n) and H'2(n) for FIR filters 941 and 942, respectively, and sets the impulse responses C1(n)–C4(n) for FIR filters 931–934, respectively, as tap coefficients.

When the setting of tap coefficients is completed, the impulse generator 950 generates an impulse signal. The impulse signal is processed by convolution in the FIR filters 941 and 942, and the FIR filters 931–934, added by adders 961 and 962, and then output, as is shown in FIG. 16. These operations are equivalent to the operations indicated by the right sides of Equations (1) and (2) which are performed by using H'1(n) and H'2(n) instead of H1(n) and H2(n).

The output of the adders 961 is compared with the impulse response T1(n) of the reference characteristic by a subtracter 971. The output of the adder 962 is compared with the impulse response T2(n) of the reference characteristic by a subtracter 972.

The outputs of the subtracters 971 and 972 (indicative of differences between the reproduction characteristics and the reference characteristics) are input into a feedback controller 980. The feedback controller 980 instructs the filter coefficient calculator 910 to repeatedly perform the operation until the absolute values of the signals from the subtracters 971 and 972 become smaller than a predetermined positive value. The filter coefficient calculator 910 repeats the operation using T1(n) and T2(n) which are delayed by a predetermined time.

When the absolute values of the output signals of the subtracters 971 and 972 become smaller than the predetermined positive value, the operation of the filter coefficient calculator 910 is stopped. Then, H'1(n) and H'2(n), which are obtained at that time, are output from output terminals 907 and 908, as the valid H1(n) and H2(n).

When the sound image localization coefficients H1(n). and H2(n) which are thus obtained are set in the sound image localization device and the reproduction is performed, a sound image can be localized at a position where a loudspeaker does not actually exist. In addition, if a sound image is localized in an expanded region, as compared with the actual loudspeaker positions with respect to the listener, it is possible to perform audio reproduction with expansion and presence.

However, in the prior art described above, the filter coefficients H1(n) and H2(n) are set for the listener 86 who stays on the center line. Accordingly, when the listener 86 moves away from the center line during the reproduction of the sound source signals S(n), and when a plurality of listeners exist, the advantages of the sound image control are drastically deteriorated for the listeners who are located at positions away from the center line, for the following reasons.

The impulse responses from the loudspeaker positioned in front of the listener 86 are usually largely different from the impulse responses from the loudspeaker positioned at the rear of the listener 86, so that the filter coefficients H1(n) and H2(n) have frequency characteristics with large peaks and dips, in order to realize T1(n) and T2(n) by using C1(n)–C4 (n). Therefore, when the position of the listener 86 is changed slightly, the impulse responses from the reproducing loudspeakers 83 and 84 to the listener are significantly varied. Accordingly, a problem associated with such a conventional technique is that the service area (an area to which good sound image control can be performed) is limited and small.

The method for calculating the filter coefficients in the above conventional technique has no problem in theory. However, in practice, if the position of the listener 86 is slightly changed, the impulse responses are significantly varied and it is difficult to correct the deviations in higher frequency ranges in particular. Therefore, a problem exists in that the quality of the sound reproduced from loudspeakers 83 and 84 is different from that of the sound actually reproduced by the reference speaker 85. This causes the deterioration of the sound quality of the sound image localized by the conventional device 800.

SUMMARY OF THE INVENTION

The apparatus of this invention calculates filter coefficients for controlling sound field and sound image, based on a plurality of first impulse response signals and a pair of second impulse response signals, the plurality of first impulse response signals indicating impulse responses from loudspeakers reproducing audio signals to both ears of a listener, the pair of second impulse response signals indicating impulse responses from a reference loudspeaker at a position at which a sound image is localized to both ears of the listener. The apparatus includes: a feature extracting section for receiving the pair of second impulse response signals, for extracting parameters representing features of the pair of second impulse response signals, and for outputting parameter signals; a signal adjusting section for adjusting at least one of the plurality of first impulse response signals based on the parameter signals, and for outputting a pair of third impulse response signals having the same features as the extracted features; and a coefficient calculation section for calculating the filter coefficients for controlling the sound field and sound image, based on the plurality of first impulse response signals and the pair of third impulse response signals applied from the signal adjusting section.

In one embodiment of the invention, the coefficient calculation section sets the filter coefficients so that the pair of third impulse response signals are substantially equal to a pair of fourth impulse response signals, the pair of fourth impulse response signals indicating a pair of impulse responses at both ears of the listener when impulse signals are reproduced from the reproducing loudspeakers.

In another embodiment of the invention, the apparatus further includes: a response characteristic calculation section for calculating a pair of impulse responses at both ears of the listener when the impulse signals are reproduced from the reproducing loudspeakers, based on the first impulse response signals and the filter coefficients, and for outputting the pair of fourth impulse response signals; a comparison section for comparing the pair of fourth impulse response signals with the pair of third impulse response signals, and for outputting a correlation signal; and a control section for outputting a control signal which controls the coefficient calculation section, based on the correlation signal, wherein, in accordance with the control signal, the coefficient calculation section selectively performs one of two operations, in one operation signals indicative of the calculated filter coefficients are output, and in the other operation the filter coefficients are again calculated using signals which are obtained by delaying the pair of third impulse response signals by a predetermined time.

In another embodiment of the invention, the feature extracting section includes: a level ratio detection section for receiving the pair of second impulse response signals, for detecting a level ratio α of the pair of second impulse response signals, and for outputting a level ratio detection signal; and a time difference detection section for receiving the pair of second impulse response signals, for detecting a time difference dt of the pair of second impulse response signals, and for outputting a time difference detection signal.

In another embodiment of the invention, the signal adjusting section includes: a selecting section for selecting a pair of first impulse response signals from among the plurality of first impulse response signals; a time difference adjusting section for receiving the selected pair of first impulse response signals and the time difference detection signal, for adjusting the selected pair of first impulse response signals so that a relative time difference of the pair of first impulse response signals is equal to the time difference dt based on the time difference detection signal, and for outputting a pair of adjusted impulse response signals; and a level ratio adjusting section for receiving the pair of adjusted impulse response signals and the level ratio detection signal, for adjusting a gain of the pair of the adjusted impulse response signals so that the level ratio of the adjusted impulse response signals in the pair is equal to the level ratio α based on the level ratio detection signal, and for outputting the pair of gain-adjusted signals as the pair of third impulse response signals.

In another embodiment of the invention, the signal adjusting section includes: a selecting section for selecting one first impulse response signal from among the plurality of first impulse response signals; a time difference adjusting section for receiving the selected first impulse response signal and the time difference detection signal, for delaying the selected first impulse response signal by the time difference dt based on the time difference detection signal, and for outputting a delayed impulse response signal; and a level ratio adjusting section for receiving the delayed impulse response signal and the level ratio detection signal, for adjusting a gain of the delayed impulse response signal by multiplication of the delayed impulse response signal by the level ratio α based on the level ratio detection signal, and for outputting an adjusted impulse response signal. Also, the pair of third impulse response signals are constituted of the selected first impulse response signal and the adjusted impulse response signal.

In another embodiment of the invention, the feature extracting section is a transfer characteristic detection section for receiving the pair of second impulse response signals, for detecting transfer characteristics of the pair of second impulse response signals, for calculating a transfer characteristic ratio, and for outputting a characteristic ratio signal.

In another embodiment of the invention, the signal adjusting section includes: a selecting section for selecting one first impulse response signal from among the plurality of first impulse response signals; and a transfer characteristic adjusting section for receiving the selected first impulse response signal and the characteristic ratio signal, for adjusting a transfer characteristic of the selected first impulse response signal based on the characteristic ratio, and for outputting an adjusted impulse response signal. Also, the pair of third impulse response signals are constituted of the selected first impulse response signal and the adjusted impulse response signal.

In another embodiment of the invention, the transfer characteristic detection section includes: a first transform section for transforming the received pair of second impulse response signals into a pair of first characteristic signals represented in frequency domain; and a first calculation section for calculating a transfer characteristic ratio of the pair of second impulse response signals based on the first characteristic signals, and the transfer characteristic adjusting section includes: a second transform section for transforming the selected first impulse response signal into a second characteristic signal represented in frequency domain; a second calculation section for multiplying the second characteristic signal by the transfer characteristic ratio indicated by the characteristic ratio signal; and an inverse transform section for transforming the multiplied signal into a signal represented in time domain.

In another embodiment of the invention, the first and second transform sections are Fourier transform sections, and the inverse transform section is an inverse Fourier transform section.

According to another aspect of the invention, the sound field/sound image control apparatus performs a sound field control and a sound image localization by processing stereophonic signals including a plurality of channel signals. The apparatus includes: an input section for inputting the plurality of channel signals; a first signal processing section for receiving the plurality of channel signals, for performing a filtering process after dividing each of the channel signals into a plurality of branched signals, and for outputting a plurality of first processed signals; a subtracting section for receiving at least two of the plurality of channel signals, for producing a difference signal by subtracting one of the two channel signals from the other channel signal, and for outputting the difference signal; at least one pair of second signal processing sections, each for receiving the difference signal, for delaying the difference signal by a predetermined time, for adjusting the level to a predetermined level, and for outputting a pair of second processed signals; at least one pair of adding sections for receiving the first processed signals and at least a pair of the second processed signals, for adding the first and the second processed signals at a predetermined ratio, and for outputting at least a pair of added signals; and at least one pair of reproducing sections, each for receiving a corresponding one of the added signals, and for reproducing the corresponding signal at a predetermined position, wherein the sound image is localized by reproducing the first processed signals, and the sound field is reproduced with presence by reproducing the second processed signals.

In one embodiment of the invention, the pair of the second signal processing sections include: a first delay section for delaying both of the received pair of difference signals by a predetermined time with respect to the first processed signals; a second delay section for delaying one of the pair of difference signals by a predetermined time with respect to the other difference signal; and a multiplying section for multiplying the pair of difference signals by respective predetermined coefficients.

In another embodiment of the invention, the predetermined coefficients, which are multiplied to the pair of difference signals, have reversed signs from each other, whereby one of the pair of difference signals is an anti-phase signal of the other difference signal.

In another embodiment of the invention, the predetermined delay time used in the second delay section is set based on a reach time difference between a pair of signals which reach a listener from at least the pair of reproducing sections, whereby the listener simultaneously receives the signals from at least the pair of reproducing sections.

In another embodiment of the invention, the apparatus further includes a second adding section for receiving the pair of added signals and the two channel signals, for adding one of the pair of added signals to one of the two channel signals, and for adding the other added signals to the other channel signals.

According to another aspect of the invention, the method is used for calculating filter coefficients for controlling sound field and sound image, based on a plurality of first impulse response signals and a pair of second impulse response signals, the plurality of first impulse response signals indicating impulse responses from loudspeakers reproducing audio signals to both ears of a listener, the pair of second impulse response signals indicating impulse responses from a reference loudspeaker at a position at which a sound image is localized to both ears of the listener. The method includes the steps of: (a) extracting features of the pair of second impulse response signals, and producing a parameter signals representing the features; (b) adjusting at least one of the plurality of first impulse response signals based on the parameter signals, and producing a pair of third impulse response signals having the same features as the extracted features; and (c) calculating the filter coefficients for controlling the sound field and sound image, based on the plurality of first impulse response signals and the produced pair of third impulse response signals.

In one embodiment of the invention, in step (c), the filter coefficients are set so that the pair of third impulse response signals are substantially equal to a pair of fourth impulse response signals, the pair of fourth impulse response signals indicating a pair of impulse responses at both ears of the listener when impulse signals are reproduced from the reproducing loudspeakers.

In another embodiment of the invention, the method further includes the steps of: (d) calculating a pair of impulse responses at both ears of the listener when the impulse signals are reproduced from the reproducing loudspeakers, based on the first impulse response signals and the filter coefficients, and producing the pair of fourth impulse response signals; (e) comparing the pair of fourth impulse response signals with the pair of third impulse response signals, and producing a correlation signal; and (f) producing a control signal which controls the coefficient calculation, based on the correlation signal. In step (c), in accordance with the control signal, one of step (c1) of producing signals indicative of the calculated filter coefficients and step (c2) of calculating again the filter coefficients using signals which are obtained by delaying the pair of third impulse response signals by a predetermined time.

In another embodiment of the invention, step (a) includes the steps of: (a1) detecting a level ratio α of the pair of second impulse response signals, and producing a level ratio detection signal; and (a2) detecting a time difference dt of the pair of second impulse response signals, and producing a time difference detection signal.

In another embodiment of the invention, step (b) includes the steps of: (b1) selecting one pair of first impulse response signals from among the plurality of first impulse response signals; (b2) adjusting the pair of first impulse response signals so that a relative time difference of the pair of first impulse response signals is equal to the time difference dt based on the time difference detection signal, and producing a pair of adjusted impulse response signals; and (b3) adjusting a gain of the pair of the adjusted impulse signals so that the level ratio of the adjusted impulse response signals in the pair is equal to the level ratio α based on the level ratio detection signal, and producing the pair of gain-adjusted signals as the pair of third impulse response signals.

In another embodiment of the invention, step (b) includes the steps of: (b4) selecting one first impulse response signal from among the plurality of first impulse response signals; (b5) delaying the selected first impulse response signal by the time difference dt based on the time difference detection signal, and producing a delayed impulse response signal; and (b6) adjusting a gain of the delayed impulse response signal by multiplying the delayed impulse response signal by the level ratio α based on the level ratio detection signal, and producing an adjusted impulse response signal. The pair of third impulse response signals are constituted of the selected first impulse response signal and the adjusted impulse response signal.

In another embodiment of the invention, step (a) includes the steps of (a3) detecting transfer characteristics of the pair of second impulse response signals, and (a4) calculating a transfer characteristic ratio, and producing a characteristic ratio signal.

In another embodiment of the invention, step (b) includes the steps of: (b7) selecting one first impulse response signal from among the plurality of first impulse response signals; and (b8) adjusting a transfer characteristic of the selected first impulse response signal based on the characteristic ratio, and producing an adjusted impulse response signal. The pair of third impulse response signals are constituted of the selected first impulse response signal and the adjusted impulse response signal.

In another embodiment of the invention, step (a3) includes: a first transform step of transforming the received pair of second impulse response signals into a pair of first characteristic signals represented in frequency domain; and a first calculation step of calculating a transfer characteristic ratio of the pair of second impulse response signals based on the first characteristic signals, and step (b8) includes: a second transform step of transforming the selected first impulse response signal into a second characteristic signal represented in frequency domain; a second calculation step of multiplying the second characteristic signal by the transfer characteristic ratio indicated by the characteristic ratio signal; and an inverse transform step of transforming the multiplied signal into a signal represented in time domain.

In another embodiment of the invention, in the first and second transform steps, Fourier transforms are performed, and in the inverse transform step, an inverse Fourier transform is performed.

According to another aspect of the invention, the sound field/sound image control method for performing a sound field control and a sound image localization by processing stereophonic signals including a plurality of channel signals, includes: an input step of inputting the plurality of channel signals; a first signal processing step of performing a filtering process after dividing each of the channel signals into a plurality of branched signals, and producing a plurality of first processed signals; a subtracting step of subtracting one of at least two of the plurality of channel signals from the other channel signal, and producing a difference signal; a second signal processing step of delaying the difference signal by a predetermined time, adjusting the level to a predetermined level, and producing a pair of second processed signals; an adding step of adding the first processed signals and at least a pair of the second processed signals at a predetermined ratio, and producing at least a pair of added signals; and a reproducing step of reproducing the pair of added signals at predetermined positions, wherein the sound image is localized by reproducing the first processed signals, and the sound field is reproduced with presence by reproducing the second processed signals.

In one embodiment of the invention, the second signal processing step includes: a first delay step of delaying both of the received pair of difference signals by a predetermined time with respect to the first processed signals; a second delay step of delaying one of the pair of difference signals by a predetermined time with respect to the other difference signal; and a multiplying step of multiplying the pair of difference signals by respective predetermined coefficients.

In another embodiment of the invention, the predetermined coefficients which are multiplied to the pair of difference signals have reversed signs from each other, whereby one of the pair of difference signals is an anti-phase signal of the other difference signal.

In another embodiment of the invention, the predetermined delay time used in the second delay step is set based on a reach time difference between the pair of added signals reproduced in the reproducing step which reach a listener, whereby the listener simultaneously receives the reproduced pair of added signals.

In another embodiment of the invention, the method further includes a second adding step of adding one of the pair of added signals to one of the two channel signals, and for adding the other added signals to the other channel signals.

In this invention, impulse responses from a reference loudspeaker which are obtained by measurements or the like to respective ears of a listener are not directly used as the reference characteristics for calculating filter coefficients. Instead, a pair of impulse responses from reproducing loudspeakers to the respective ears are used for the calculation. The relative time difference and the relative level (the level ratio) of the pair of impulse responses from the reproducing loudspeakers are controlled so as to be made equal to the time difference and the level ratio of a pair of impulse responses from the reference loudspeaker to the respective ears, thereby obtaining a pair of signals which are adopted. Accordingly, the difference in amplitude/frequency characteristics between the reference characteristics and the reproduction-system original characteristics can be minimized. Also, the relative time difference and the level difference between impulse responses at the respective ears of the listener during the sound image control are maintained in the reproduction-system original characteristics, so that it is possible to perform the sound image control with reduced deterioration of sound quality.

According to the invention, in the case where there are a plurality of listeners, for listeners on the center line in the arrangement of the reproducing loudspeakers, the expansion is realized by localizing the L-ch and R-ch source signals in a region expanded from the located positions of the L-ch and R-ch reproducing loudspeakers. Also, for listeners at positions shifted from the center line, spatial expansion is realized by adjusting the delay amounts of the difference signals, including reverberation components of the source signals and their anti-phase signals, so that the sounds from the respective reproducing loudspeakers simultaneously reach the listeners. Accordingly, all the listeners positioned on the center line and at positions shifted from the center line can feel expansion. Thus, it is possible to perform a sound field reproduction with presence in a wide service area.

Thus, the invention described herein makes possible the advantage of providing a sound field and sound image control apparatus and a sound field and sound image control method with a reduced deterioration in reproduced sound quality and with a wide service area.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrative examples with reference to the accompanying drawings.

EXAMPLE 1

Figure 1:
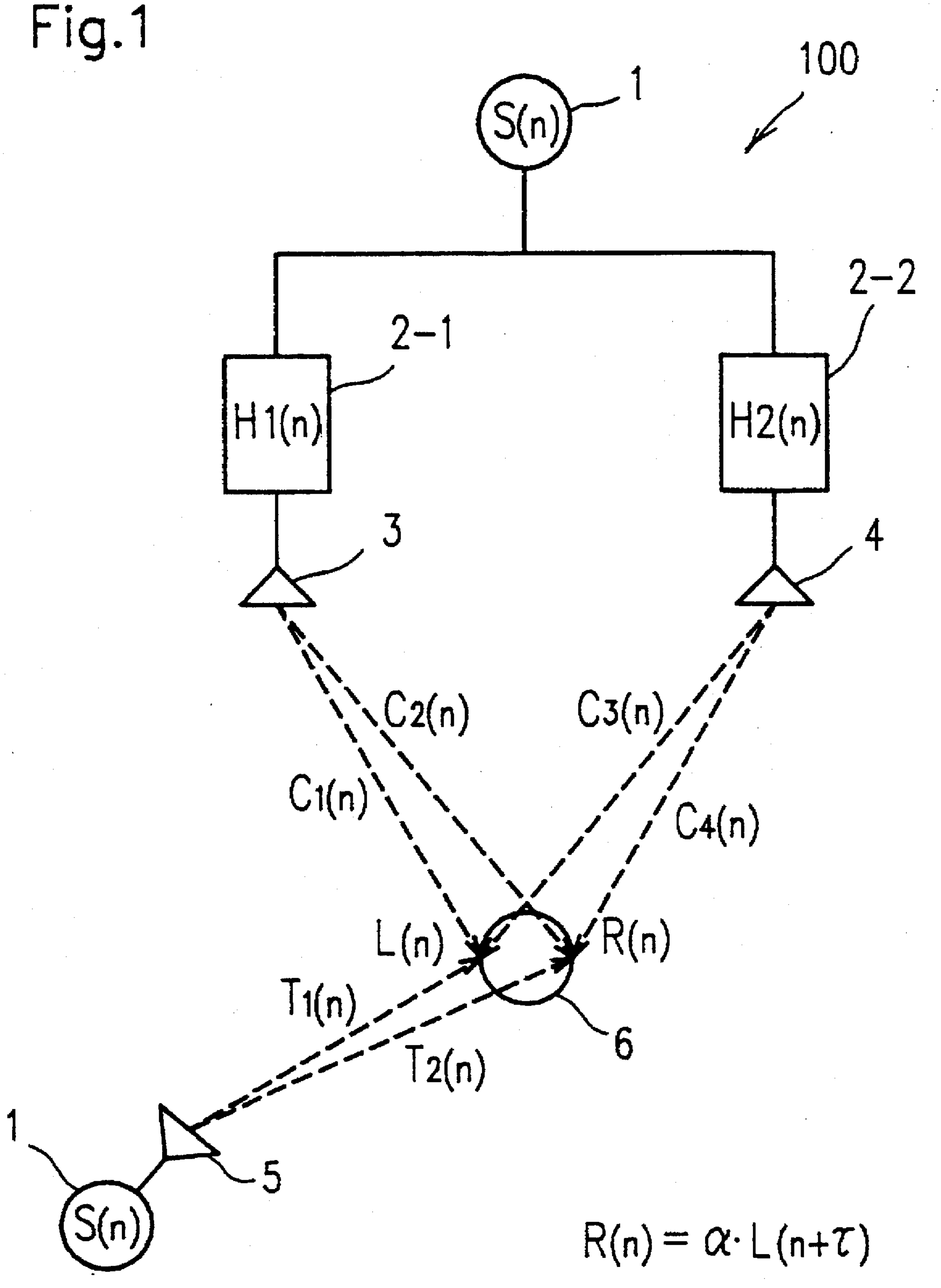
FIG. 1 schematically shows a method for localizing a sound image in the left rear of a listener by a sound field and sound image control apparatus in a first example according to the invention.

FIG. 1 schematically shows a method for localizing a sound image in the left rear of a listener 6 by a sound field and sound image control apparatus 100 in a first example according to the invention.

In the apparatus 100, sound source signals S(n) generated by a sound source 1 are processed by FIR filters 2-1 and 2-2, and then the processed signals are reproduced from a L-ch reproducing loudspeaker 3 and a R-ch reproducing loudspeaker 4, respectively. For the FIR filter 2-1, filter coefficients H1(n) are set. For the FIR filter 2-2, filter coefficients H2(n) are set. In cases where the apparatus 100 is used for digital processing, an A/D converter and a D/A converter are required. For simplicity, such converters are omitted in the figure. The listener 6 stays at a position distant from the two loudspeakers 3 and 4 by equal distances (i.e., on the center line), and faces the front (i.e., faces toward the middle point between two loudspeakers).

In FIG. 1, C1(n) indicates an impulse response from the loudspeaker 3 at the position of the left ear of the listener 6 (to be more accurate, the position of the eardrum; and in the actual measurement, it is measured at the entrance of the auditory canal when an impulse is input to the L-ch loudspeaker 3). Similarly, C2(n) indicates an impulse response from the L-ch loudspeaker 3 at the position of the right ear of the listener 6, C3(n) indicates an impulse response from the R-ch loudspeaker 4 at the position of the left ear of the listener 6, and C4(n) indicates an impulse response from the R-ch loudspeaker 4 at the position of the right ear of the listener 6. In addition, T1(n) and T2(n) indicate impulse responses from a reference loudspeaker 5 to the left and right ears of the listener 6, respectively. The respective values of C1(n)–C4(n), T1(n) and T1(n) can be obtained by actual measurements or simulation.

In this example, the sound source signals S(n) are processed by the FIR filters 2-1 and 2-2 in the following manner. First, a reach time difference dt and a level ratio $\alpha$ of a pair of signals respectively reaching the left and right ears of the listener 6 are obtained when the sound source signals S(n) are output from the reference loudspeaker 5 (the reach time difference dt and the level ratio $\alpha$ are parameters indicative of the characteristics of reference impulse responses). Then, the convolution process is performed in such a manner that a reach time difference and a level ratio of signals respectively reaching the left and right ears of the listener 6 when the audio signals are output from the reproducing loudspeakers 3 and 4 are made equal to the reach time difference dt and the level ratio $\alpha$.

For example, when a pair of impulse responses from reproducing loudspeakers 3 and 4 to both ears of a listener are represented by L(n) (left ear) and R(n) (right ear), the relationship expressed by Equation (3) below must be established in order to satisfy the above condition. In this example, H1(n) and H2(n) which satisfy the condition of Equation (3) are set for the FIR filters 2-1 and 2-2.

$$R(n)=\alpha\cdot L(n+\tau) \quad (3)$$

In the above equation, $\tau$ indicates, when a signal S(n) is output from the reference loudspeaker 5, a time difference dt in the notation of discrete time obtained by subtracting the time $t_R$ at which the signal reaches the right ear from the time $t_L$ at which the signal reaches the left ear; and $\alpha$ is obtained by dividing the level of the signal which reaches the right ear by the level of the signal which reaches the left ear. Usually, in the case where the loudspeaker 5 is located on the left side as is shown in FIG. 1, $\tau\leqq 0$, and $\alpha\leqq 1$. In addition, the time difference dt and the level ratio $\alpha$ can be calculated by using the times at which the peaks of the respective signals reached and the signal levels at the peaks.

Figure 2:
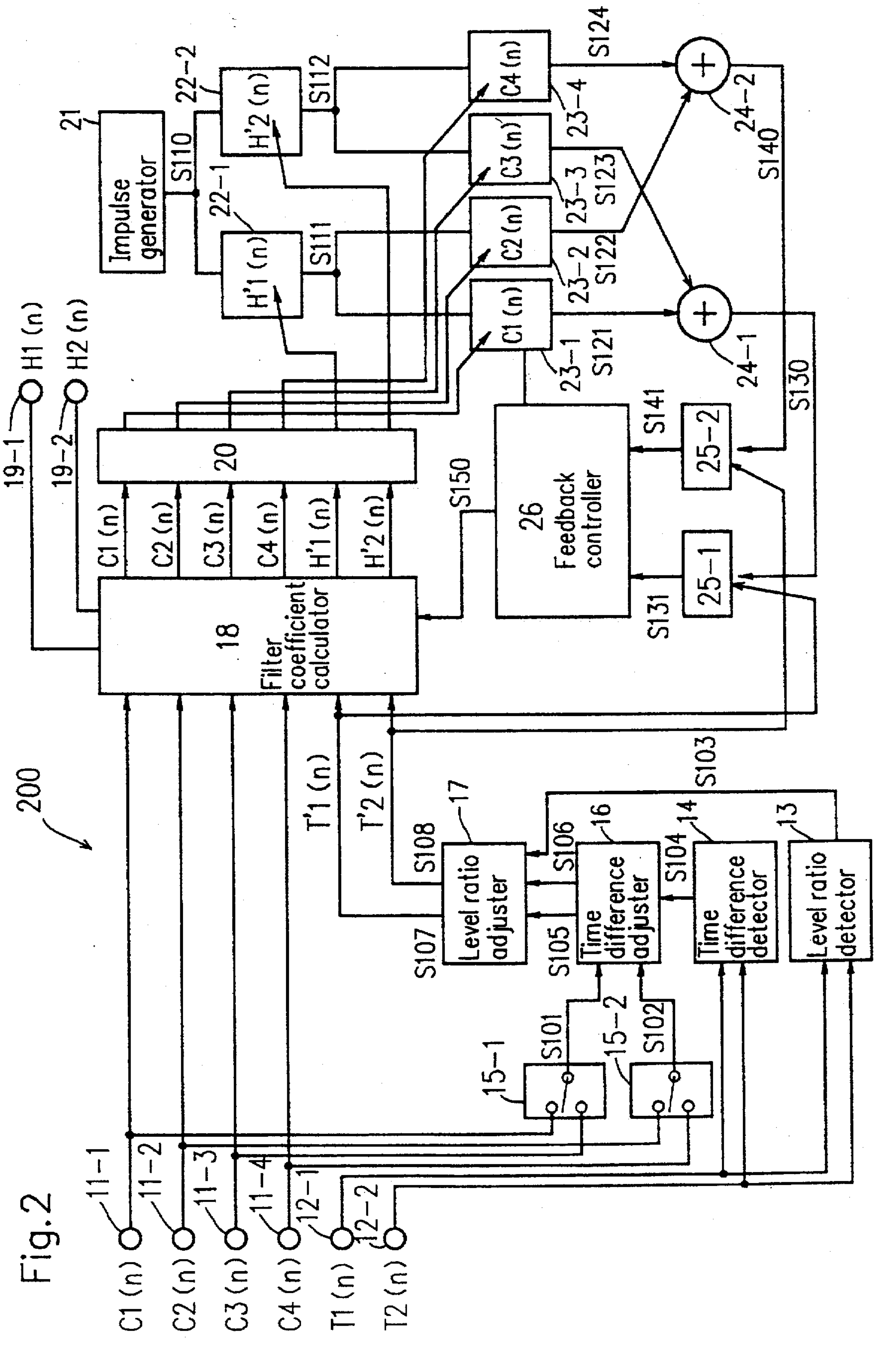
FIG. 2 is a block diagram showing a sound image control coefficient calculating device for the sound field and sound image control of the first example.

Next, referring to FIG. 2, a device and a method for calculating the filter coefficients (impulse responses) H1(n) and H2(n) in the sound field and sound image control apparatus 100 of this example will be described. FIG. 2 is a block diagram showing a filter coefficient (hereinafter referred to as sound image control coefficient) calculating device 200 for the sound field and sound image control of this example.

The device 200 includes reproduction-system characteristics input terminals 11-1 to 11-4 for inputting signals representing impulse responses from two reproducing loudspeakers to both ears of a listener, and reference characteristics input terminals 12-1 and 12-2 for inputting signals representing impulse responses from the reference loudspeaker located at a position at which a sound image is to be localized to both ears of the listener. The impulse response signals which are input to the respective input terminals correspond to the impulse responses C1(n)–C4(n) and the impulse responses T1(n) and T2(n) shown in FIG. 1. Hereinafter the impulse response signals corresponding to the respective impulse responses are represented by SC1(n), ST1(n) and the like.

The device 200 includes a filter coefficient calculator 18, FIR filters 22-1, 22-2, and 23-1 to 23-4, a filter coefficient setting device 20, an impulse generator 21, adders 24-1 and 24-2, correlation ratio calculators 25-1 and 25-2, a feedback controller 26, and filter coefficient output terminals 19-1 and 19-2. The filter coefficient calculator 18 calculates a pair of filter coefficients (in the figure, indicated by H'1(n) and H'2(n)) in accordance with the left sides of Equations (1) and (2), based on the impulse response signals SC1(n) to SC4(n) representing the reproduction-system characteristics, and the pair of impulse response signals ST'1(n) and ST'2(n) representing the reference characteristics. The filter coefficient setting device 20 sets the filter coefficients for the respective FIR filters 23-1 to 23-4, 22-1 and 22-2, based on the impulse response signals SC1(n) to SC4(n) and the signals SH'1(n) and SH'2(n) representing the filter coefficients which are all output from the filter coefficient calculator 18. The impulse generator 21 supplies an impulse signal S110 to the FIR filters 22-1 and 22-2. The adders 24-1 and 24-2 add the signals S121–S124 which are output from the FIR filters 23-1 to 23-4. The correlation ratio calculators 25-1 and 25-2 calculate correlation ratio of the outputs S130 and S140 from the adders 24-1 and 24-2 and the impulse response signals ST'1(n) and ST'2(n), respectively. The feedback controller 26 compares the correlation ratios with a predetermined value, and controls the filter coefficient calculator 18 based on the compared result. The filter coefficient output terminals 19-1 and 19-2 output the final filter coefficients H1(n) and H2(n) calculated by the filter coefficient calculator 18.

The device 200 further includes a level ratio detector 13, a time difference detector 14, switches 15-1 and 15-2, a time difference adjuster 16, and a level ratio adjuster 17. The level ratio detector 13 detects a level ratio $\alpha$ of signal levels between the pair of impulse response signals ST1(n) and ST2(n) input through the reference characteristics input terminals 12-1 and 12-2. The time difference detector 14 detects a relative time difference dt between the pair of impulse response signals ST1(n) and ST2(n). The switches 15-1 and 15-2 select a pair of impulse response signals from among the impulse response signals SC1(n)–SC4(n) which are input through the reproduction-system characteristics input terminals 11-1–11-4. The time difference adjuster 16 adjusts a delay time so that the relative time difference between the pair of impulse response signals S101 and S102, which are selected by the switches 15-1 and 15-2, is made equal to the time difference dt. The level ratio adjuster 17 adjusts signal levels so that the level ratio of the pair of impulse response signals S105 and S106, which are output from the time difference adjuster 16, is made equal to the level ratio α. The level ratio adjuster 17 outputs impulse response signals ST'1(n) and ST'2(n) representing reference characteristics T'1(n) and T'2(n).

A method for calculating a sound image control coefficient performed by the sound image control coefficient calculating device 200 in the first example with the above-described construction will be described below.

Each of the impulse response signals SC1(n)–SC4(n), which are input through the reproduction-system characteristics input terminals 11-1 to 11-4, is branched into two signals which are in turn input to the filter coefficient calculator 18 and the switch 15-1 or 15-2, respectively. The signals SC1(n) and SC3(n) are input to the switch 15-1, and the signal SC2(n) and SC4(n) are input to the switch 15-2. Each of the switches 15-1 and 15-2 selects one of the two input impulse response signals, and outputs the selected signal to the time difference adjuster 16. At this stage, the pair of signals SC1(n) and SC2(n) are selected when the sound image is to be localized on the left side of the listener, and the pair of signals SC3(n) and SC4(n) are selected when the sound image is to be localized on the right side of the listener. The impulse response signals selected by the switches 15-1 and 15-2 are input into the time difference adjuster 16 as signals S101 and S102, respectively.

Each of the impulse response signals ST1(n) and ST2(n), which are input through the reference characteristics input terminals 12-1 and 12-2, is branched into two signals which are in turn input into the level ratio detector 13 and the time difference detector 14. In the level ratio detector 13, the level ratio α of the signals ST1(n) and ST2(n) is calculated, and the calculated level ratio is fed to the level ratio adjuster 17 as a level ratio detection signal S103. In the time difference detector 14, the relative time difference dt between the impulse response signals ST1(n) and ST2(n) is calculated, and the calculated time difference is output to the time difference adjuster 16 as a time difference detection signal S104. The time difference adjuster 16 receives the pair of impulse response signals S101 and S102 from the switches 15-1 and 15-2 and the time difference detection signal S104 from the time difference detector 14. Then, the time difference adjuster 16 adjusts the impulse response signals S101 and S102 so that the relative time difference between the impulse response signals S101 and S102 is made equal to the time difference dt indicated by the time difference detection signal S104. The adjusted signals are output to the level ratio adjuster 17 as the signals S105 and S106.

The level ratio adjuster 17 receives the level ratio detection signal S103, the signals S105 and S106, and performs a gain adjustment so that the level ratio of the signals S105 and S106 is made equal to the level ratio α indicated by the level ratio detection signal S103. Then, the level ratio adjuster 17 outputs a signal S107 (the reference characteristics signal ST'1(n)) and a signal S108 (ST'2(n)) for calculating the filter coefficient to the filter coefficient calculator 18.

Figure 3:
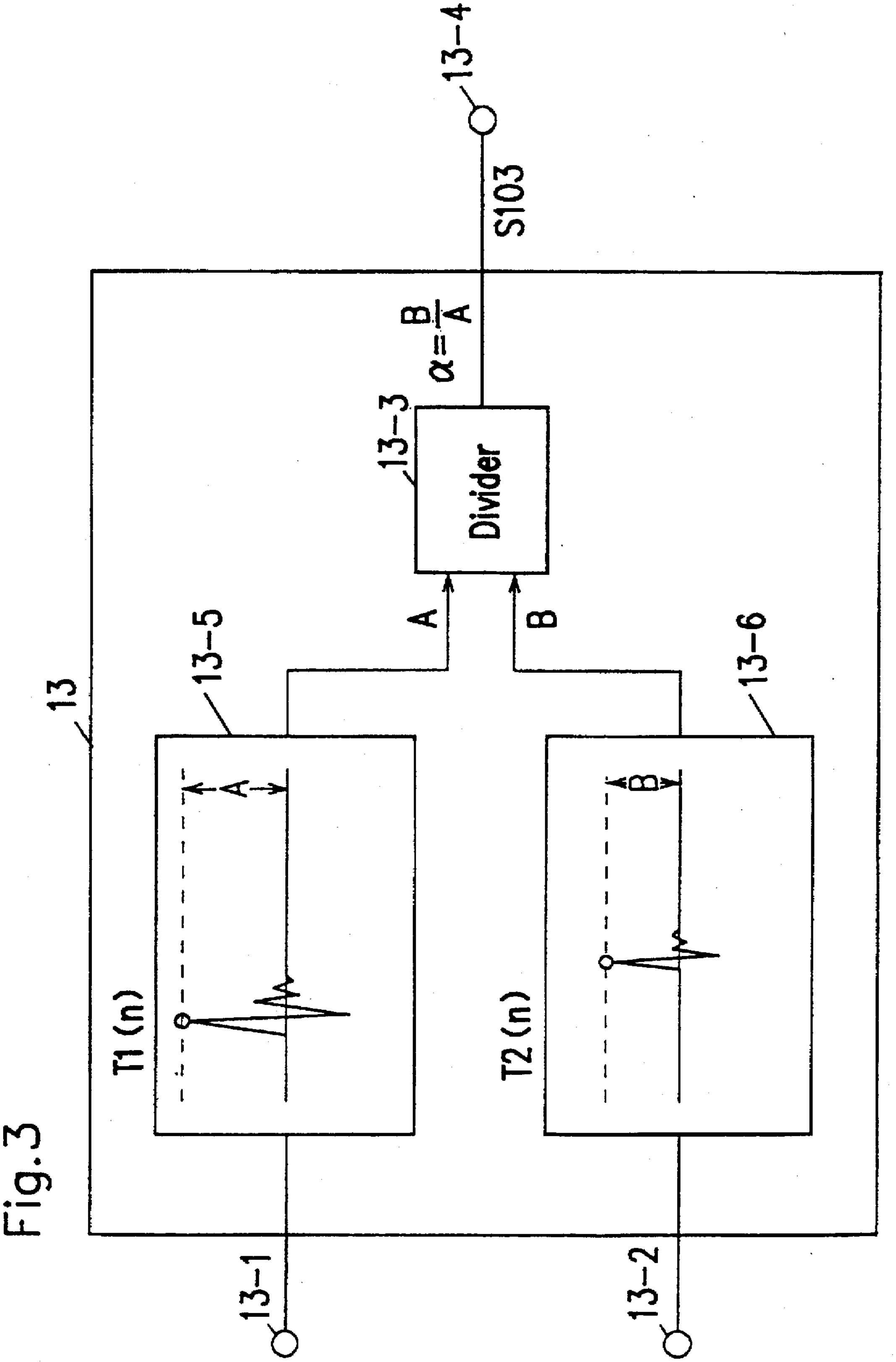
FIG. 3 shows an exemplary level ratio detector.

FIG. 3 shows an example of the level ratio detector 13 and a level ratio detecting method performed by the level ratio detector 13. For example, the level ratio detector 13 can be constructed by a divider 13-3, and peak detecting circuits 13-5 and 13-6. Through input terminals 13-1 and 13-2, the impulse response signals ST1(n) and ST2(n) are input, respectively. By the peak detecting circuits 13-5 and 13-6, a peak level A of the signal ST1(n) and a peak level B of the signal ST2(n) are detected, respectively, and the detected values are fed to the divider 13-3. In the divider 13-3, a peak level ratio α=B/A is calculated and output from an output terminal 13-4 as the level ratio detection signal S103. In FIG. 3 and also in FIGS. 4 to 6, the input signals ST1(n) and ST2(n) are schematically represented by showing the peak sound pressures A and B in which the horizontal axis denotes a time and the vertical axis denotes a voltage value. If the sound pressure is represented in decibel, a subtracter for calculating (A–B) is used instead of the divider.

Figure 4:
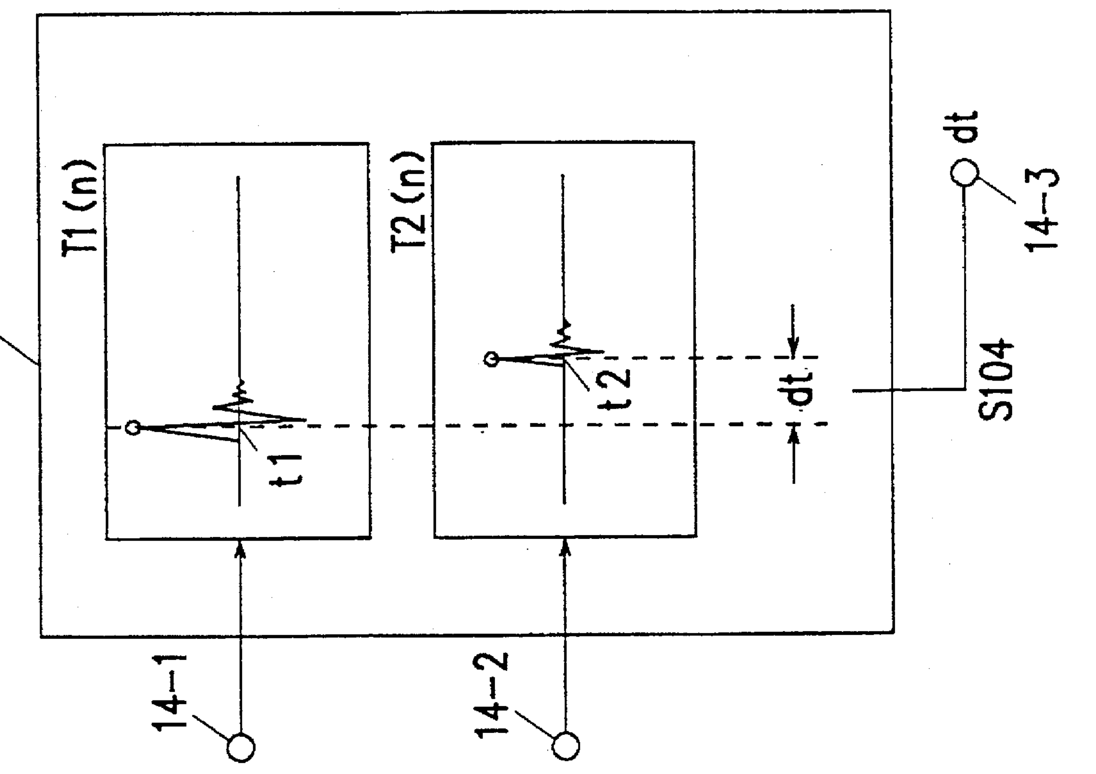
FIG. 4 shows an exemplary time difference detector.

FIG. 4 shows an example of the time difference detector 14 and a time difference detecting method performed by the time difference detector 14. The time difference detector 14 first detects times $t_1$ and $t_2$ corresponding to the peak levels for the impulse response signals ST1(n) and ST2(n) which are input through input terminals 14-1 and 14-2, respectively. The detecting circuits for detecting a peak of a signal level and for detecting a time corresponding to the peak can be realized by a conventional techniques using a microcomputer or the like. From the times $t_1$ and $t_2$, a relative time difference dt is obtained and output through an output terminal 14-3 as the time difference detection signal S104.

Figure 5:
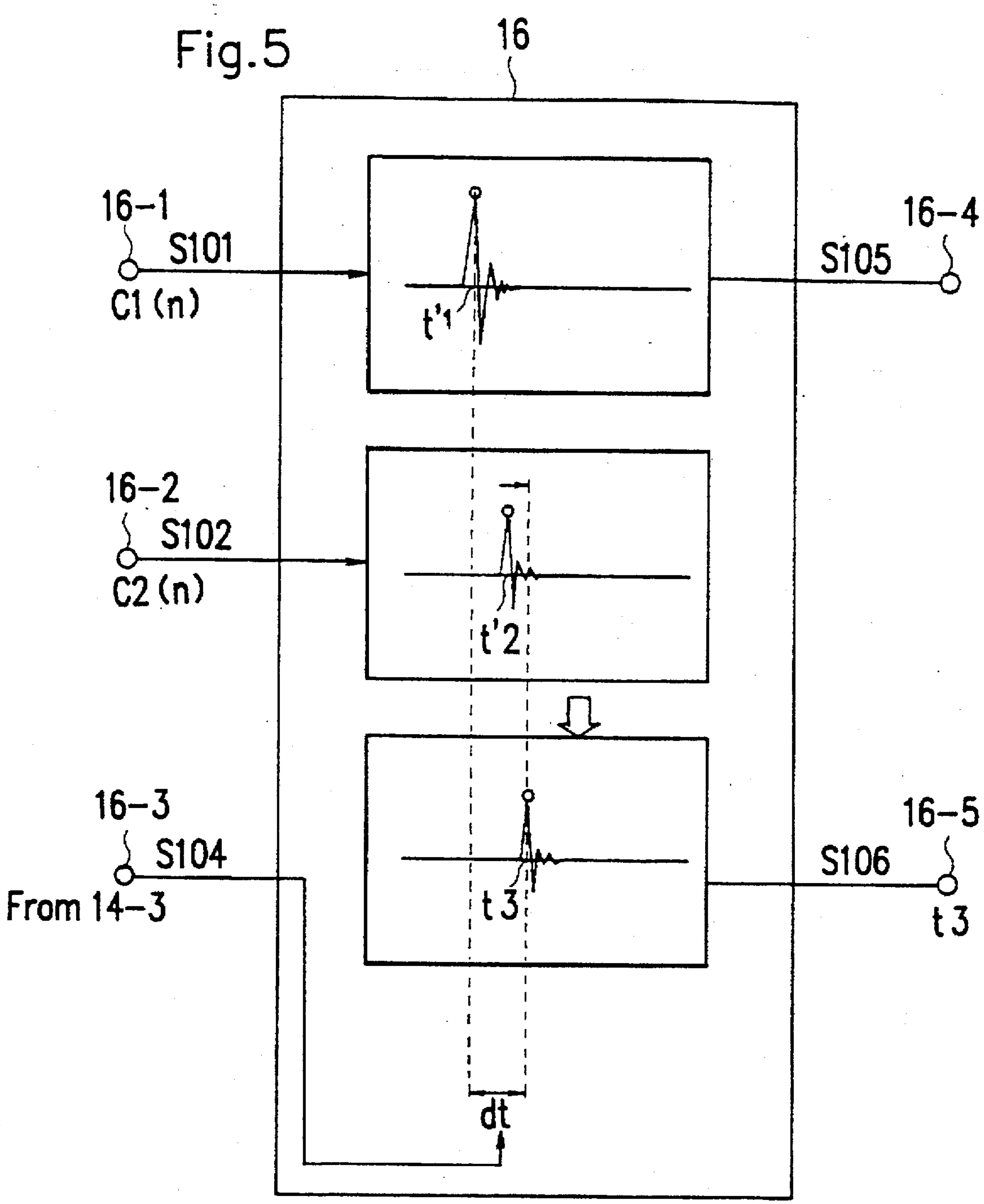
FIG. 5 schematically shows an exemplary time difference adjuster.

FIG. 5 schematically shows an example of the time difference adjuster 16 and a time difference adjusting method performed by the time difference adjuster 16. The time difference adjuster 16 first detects times $t'_1$ and $t'_2$ corresponding to the peak levels of the impulse response signals S101 and S102 input through input terminals 16-1 and 16-2, respectively. Herein, the pair of the signals S101 and S102 may be a pair of the impulse response signals SC1(n) and SC2(n).

Through an input terminal 16-3, the time difference detection signal S104 is input. Based on the time difference dt indicated by the signal S104, the signal S102 is delayed so that the peak position of the signal S102 is adjusted to be a time $t_3$. That is, the signal S102 is delayed by $t=dt-t'_2+t'_1$ so that the time difference between $t'_1$ and $t_3$ is made equal to dt. The signal S106 which is obtained by delaying the signal S102 is output through an output terminal 16-5. The signal S101 is directly output through an output terminal 16-4 as the output signal S105. In this way, the time difference at the peak sound pressure between the signals S105 and S106 output from the time difference adjuster 16 is adjusted so as to be equal to the time difference dt indicated by the time difference detection signal S104.

Figure 6:
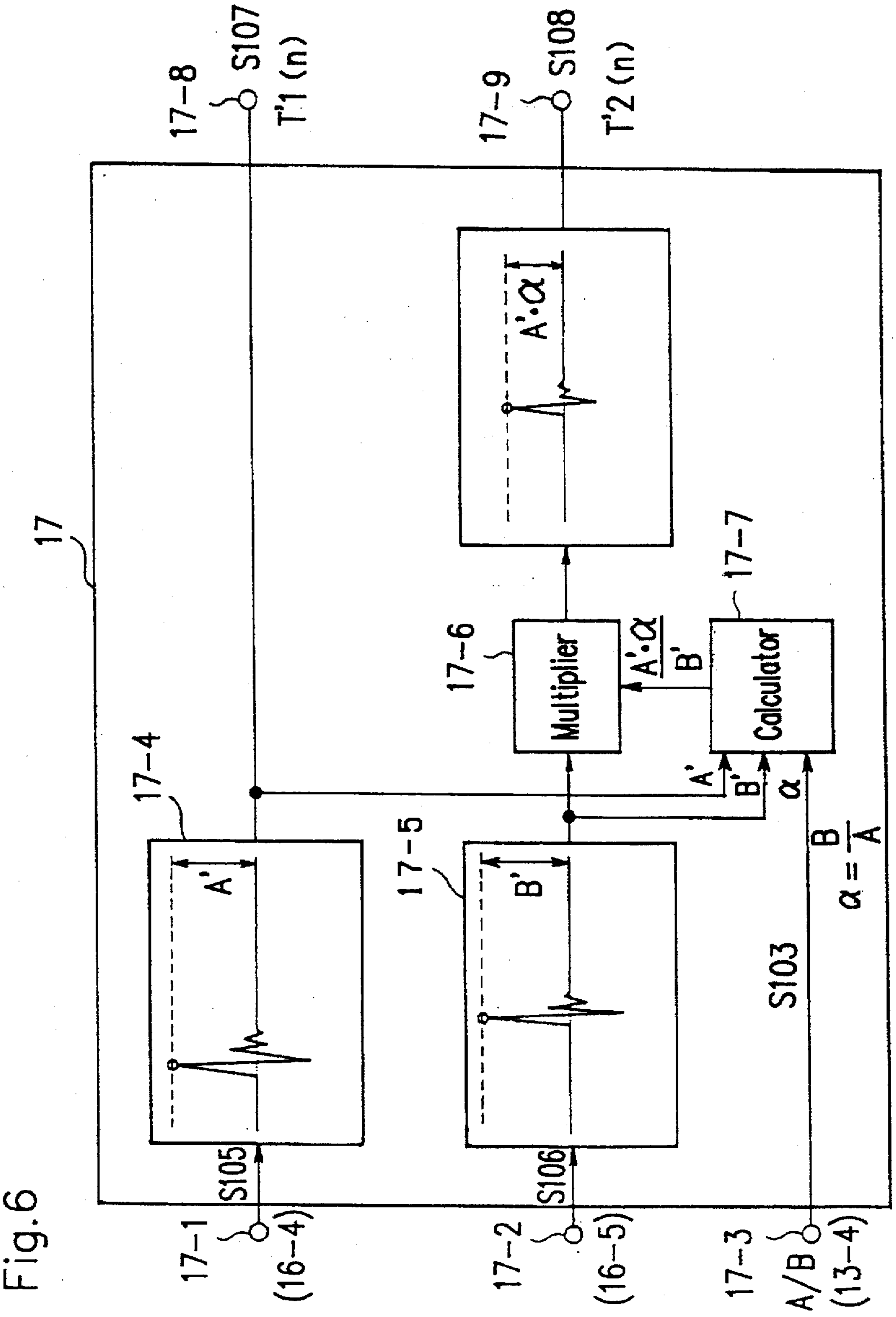
FIG. 6 schematically shows an exemplary level ratio adjuster.

FIG. 6 is a schematic diagram showing an example of the level ratio adjuster 17 and a level ratio adjusting method performed by the level ratio adjuster 17. The level ratio adjuster 17 can be constructed of peak detecting circuits 17-4 and 17-5, a multiplier 17-6, and a calculator 17-7 by using a conventional signal processing technique.

Through an input terminal 17-1, the output signal S105 of the time difference adjuster 16, and through an input terminal 17-2, the signal S106 is input. By the peak detecting circuits 17-4 and 17-5, a peak sound pressure A' of the input signal S105 and a peak sound pressure B' of the input signal S106 are detected, respectively.

Through an input terminal 17-3, the level ratio detection signal S103 is input from the level ratio detector 13. The calculator 17-7 receives signals indicating the peak sound pressures A' and B' and the signal S103 indicating the level ratio α, and calculates (A'·α)/B'. The calculated result is output to the multiplier 17-6. The multiplier 17-6 multiplies the input signal S106 by the calculated result (A'·α)/B', and the resulting signal S108 is output. The peak level of the output signal S108 is A'·α, so that the level ratio of the signals S108 and S105 is α. The output signal having the peak level A'·α is output through an output terminal 17-9 as an impulse response signal ST'2(n). The signal S105 is directly output through an output terminal 17-8 as the output signal S107. In this way, the signals S107 and S108 output from the level ratio adjuster 17 have a peak ratio which is equal to the peak ratio α which is given by the peak ratio detection signal S103. These signals S107 and S108 are fed to the filter coefficient calculator 18 as the impulse response signals ST'1(n) and ST'2(n), respectively.

The filter coefficient calculator 18 receives the impulse response signals SC1(n)–SC4(n) applied through the reproduction-system characteristics input terminals 11-1–11-4, and also receives the impulse response signals ST'1(n) and ST'2(n) applied from the level ratio adjuster 17. The filter coefficient calculator 18 calculates filter coefficients H'1(n) and H'2(n) which satisfy Equations (4) and (5) below, based on the impulse responses C1(n)–C4(n), T'1(n) and T'2(n).

$$T'1(n)=H'1(n)*C1(n)+H'2(n)*C3(n) \quad (4)$$

$$T'2(n)=H'1(n)*C2(n)+H'2(n)*C4(n) \quad (5)$$

The filter coefficient calculator 18 can be constructed as a matrix calculator. Instead of the matrix calculator, it is possible to use another calculator in which the coefficients are obtained by performing the Fourier transform for the impulse response, and performing the operation in the frequency domain.

The impulse response signals SC1(n)–SC4(n) and the impulse response signals SH'1(n) and SH'2(n) based on the calculated results are fed to the filter coefficient setting device 20. The filter coefficient setting device 20 sets the coefficient H'1(n) for the FIR filter 22-1 and the coefficient H'2(n) for the FIR filter 22-2, as their tap coefficients. Similarly, for the FIR filters 23-1–23-4, the impulse responses C1(n)–C4(n) are set.

After the tap coefficients of the FIR filters are set, a pulse signal S110 is supplied from the impulse generator 21 to the FIR filters 22-1 and 22-2. The filters 22-1 and 22-2 perform the filtering processes (convolution) in accordance with their tap coefficients (impulse responses H'1(n) and H'2(n)). The resulting signal S111 is branched into two signals which are in turn input to the FIR filters 23-1 and 23-2. The resulting signal S112 is branched into two signals which are in turn input to the FIR filters 23-3 and 23-4. The FIR filters 23-1–23-4 perform the filtering processes in accordance with their tap coefficients (impulse responses C1(n)–C4(n)), and outputs resulting signals S121–S124.

The adder 24-1 receives the signals S121 and S123, and adds the signals to each other. The resulting added signal S130 is supplied to the correlation ratio calculator 25-1. The adder 24-2 receives the signals S122 and S124, and adds the signals to each other. The resulting added signal S140 is supplied to the correlation ratio calculator 25-2.

The added signal S130 corresponds to the calculation result shown in the right side of Equation (4), and the added signal S140 corresponds to the calculation result shown in the right side of Equation (5). That is, the added signals S130 and S140 correspond to the impulse responses L(n) and R(n) which are realized at the left-ear and right-ear positions of a listener by the calculated filter coefficients H'1(n) and H'2(n).

The correlation ratio calculator 25-1 calculates a correlation ratio of the impulse response T'1(n) which is applied from the level ratio adjuster 17 as the reference characteristics to the added signal S130 applied from the adder 24-1, thereby generating a correlation ratio signal S131. Similarly, the correlation ratio calculator 25-2 calculates a correlation ratio of the impulse response T'2(n) which is applied from the level ratio adjuster 17 as the reference characteristics to the added signal S140 applied from the adder 24-2, thereby generating a correlation ratio signal S141. Each of the correlation ratio calculators 25-1 and 25-2 can be constructed of a subtracter and an adder (and, if necessary, a divider for dividing the subtracted result by the added result) by using a conventional technique. For example, the subtracter may subtract one of two input signals from the other and output an absolute value of the obtained difference, and the adder may add the respective absolute values of two input signals to each other. In the case where the divider is used, the correlation ratio can be a value of 0 to 1.

The feedback controller 26 receives the correlation ratio signals S131 and S141, and compares the signals with a predetermined value. Based on the compared result, the feedback controller 26 generates a control signal S150 which is supplied to the filter coefficient calculator 18. If the correlation ratios indicated by the correlation ratio signals S131 and S141 are equal to or larger than the predetermined value, the control signal S150 instructs the filter coefficient calculator 18 to stop the operation. Otherwise, the control signal S150 instructs the calculator 18 to continue the operation.

The filter coefficient calculator 18 stops the filter coefficient calculation if the stop is instructed by the control signal S150 applied from the feedback controller 26. In this case, the filter coefficient calculator 18 outputs the filter coefficients H'1(n) and H'2(n), which have been obtained in the previous calculation, through filter coefficient output terminals 19-1 and 19-2 as the final filter coefficients H1(n) and H2(n). In the case where the calculation is instructed to be continued by the control signal S150, the impulse responses T'1(n) and T'2(n) are delayed by a predetermined time, and again the filter coefficients H'1(n) and H'2(n) are calculated. Then, the same processes are repeated.

The feedback control is performed for compensating the delay due to the filtering processes in the FIR filters 22-1 and 22-2, and can be performed by a software processing using a dedicated microcomputer. As a result of the feedback control, the right sides of Equations (4) and (5) can be used for calculating the filter coefficients H1(n) and H2(n) which are more accurately in accord with not only the profiles of the impulse responses T'1(n) and T'2(n) but also the times of the impulse responses.

In this way, in the case, for example, where the sound image is to be localized on the left side of the listener 6 by the sound field and sound image control apparatus 100, it is possible to minimize the difference between the sound quality of the sound image localized by the apparatus 100 and the sound quality of the sound reproduced from the left-side (the side on which the sound image is localized) reproducing loudspeaker 3 without using the apparatus 100. Similarly, in the case where the sound image is to be localized on the right side of the listener 6 by the apparatus 100, it is possible to minimize the difference between the sound quality of the localized sound image and the sound quality of the sound reproduced from the right-side reproducing loudspeaker 4 without using the apparatus 100.

In this example, the cases where the sound image is to be localized on the left side and the right side of the listener 6 are described. Alternatively, irrespective of the position at which the sound image is to be localized, either a pair of C1(n) and C2(n) or a pair of C3(n) and C4(n) may be used.

As described above, the device 200 in this example does not directly use the impulse responses T1(n) and T2(n) from the reference loudspeaker 5 actually located at a position at which the sound image is localized to both ears of the listener 6. The device 200 in this example uses, as the reference characteristics, the impulse responses T'1(n) and T'2(n) which are obtained by controlling the level ratio and the relative time difference of the (pair of) impulse responses from one of the reproducing loudspeakers 3 and 4 to both ears of the listener 6, thereby calculating the filter coefficients. Accordingly, it is possible to reduce the change in sound quality of the localized sound image while maintaining the effects of the sound image localization.

Also, as described above, the filter coefficients for sound image control are calculated while the impulse responses T'1(n) and T'2(n) representing the reference characteristics are both delayed by a very little time period using a method of successive approximation (iteration method), whereby more accurate results can be obtained.

EXAMPLE 2

Figure 7:
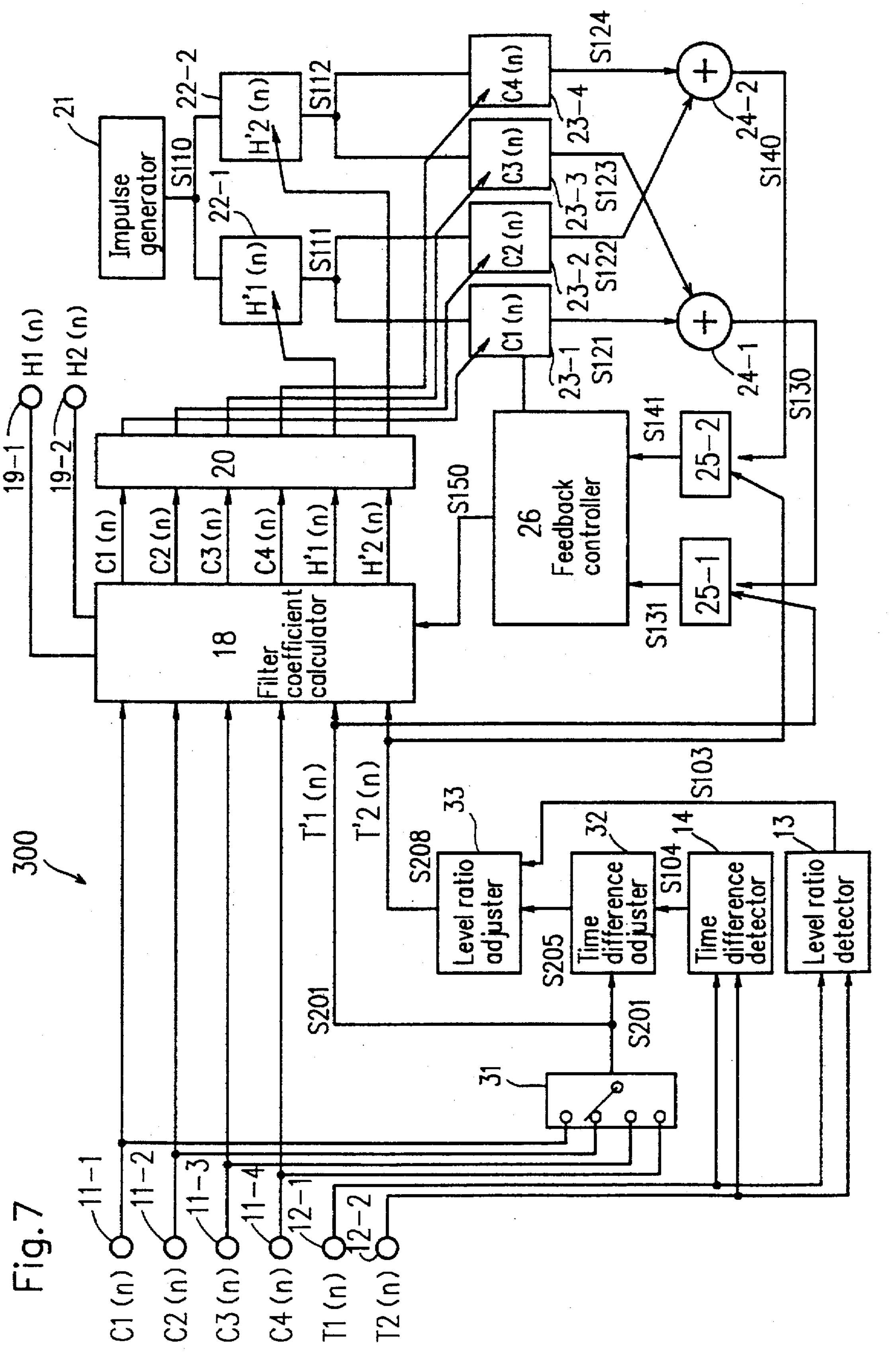
FIG. 7 is a block diagram showing a sound image control coefficient calculating device in a second example according to the invention.

Next, a device for calculating sound image control coefficients and a sound image control coefficient calculating method in a second example according to the invention will be described. FIG. 7 is a block diagram showing a sound image control coefficient calculating device 300 of the second example.

The device 300 includes reproduction-system characteristics input terminals 11-1–11-4, reference characteristics input terminals 12-1 and 12-2, a filter coefficient calculator 18, FIR filters 22-1, 22-2, and 23-1–23-4, a filter coefficient setting device 20, an impulse generator 21, adders 24-1 and 24-2, a correlation ratio calculators 25-1 and 25-2, a feedback controller 26, and filter coefficient output terminals 19-1 and 19-2. These components and elements are the same as those used in the device 200 in the first example, so that the descriptions thereof are omitted.

The device 300 further includes a level ratio detector 13, a time difference detector 14, a switch 31, a time difference adjuster 32, and a level ratio adjuster 33. Among them, the level ratio detector 13 and the time difference detector 14 are the same as those in the device 200 in the first example.

Each of the impulse response signals SC1(n)–SC4(n) input through the reproduction-system characteristics input terminals 11-1–11-4 is branched into two signals, which are in turn input into the filter coefficient calculator 18 and the switch 31. The switch 31 selects one of the four input impulse response signals and output the selected signal. The selected impulse response signal S201 is branched into two signals, which are in turn applied to the time difference adjuster 32 and the filter coefficient calculator 18. The impulse response signal S201 applied to the filter coefficient calculator 18 is directly used as the reference characteristic T'1(n) for calculating the filter coefficients.

Each of the impulse response signals ST1(n) and ST2(n) input through the reference characteristics input terminals 12-1 and 12-2 is branched into two signals, which are in turn input to the level ratio detector 13 and the time difference detector 14. In the level ratio detector 13, a level ratio $\alpha$ of the signals ST1(n) and ST2(n) is calculated, and the calculated result is applied to the level ratio adjuster 33 as a level ratio detection signal S103. In the time difference detector 14, a relative time difference dt between the impulse response signals ST1(n) and ST2(n) is calculated, and the calculated result is output to the time difference adjuster 32 as a time difference detection signal S104. The constructions and the operations of the level ratio detector 13 and the time difference detector 14 are the same as those in the device 200 described in the first example.

The time difference adjuster 32 receives the impulse response signal S201 output from the switch 31 and the time difference detection signal S104 output from the time difference detector 14. The time difference adjuster 32 delays the impulse response signal S201 by a time corresponding to the time difference dt indicated by the time difference detection signal S104. The delayed signal is output to the level ratio adjuster 33 as a signal S205.

The level ratio adjuster 33 receives the signal S205 and the level ratio detection signal S103, and performs the gain adjustment by multiplying the delayed impulse response signal S205 by the level ratio $\alpha$ indicated by the level ratio detection signal S103. Then, the gain-adjusted signal S208 is output to the filter coefficient calculator 18. The signal S208 is a signal obtained by delaying the impulse response signal S201 (i.e., the reference characteristics signal ST'1(n)) by a time dr, and by multiplying the level by $\alpha$. The signal S208 is input to the filter coefficient calculator 18 as the other reference characteristics signal ST'2(n) for calculating the filter coefficients.

The filter coefficient calculator 18 receives the impulse response signals SC1(n)–SC4(n) applied through the reproduction-system characteristics input terminals 11-1–11-4, the impulse response signal S201 (i.e., the reference characteristics signal ST'1(n)) applied from the switch 31, and the impulse response signal S208 (i.e., ST'2(n)) applied from the level ratio adjuster 33. Based on the impulse responses C1(n)–C4(n), T'1(n), and T'2(n), the filter coefficient calculator 18 calculates the filter coefficients H'1(n) and H'2(n) which satisfy Equations (4) and (5) above, the same as in the device 200.

The subsequent signal processes are the same as those in the device 200 described in the first example, and the final filter coefficients H1(n) and H2(n) are output through the output terminals 19-1 and 19-2.

As described above, the device 300 in this example does not directly use the impulse responses T1(n) and T2(n) from the reference loudspeaker 5 actually located at a position at which the sound image is to be localized to both ears of the listener 6. The device 300 in this example uses, as the reference characteristics, an impulse response (T'1(n)) from one of the reproducing loudspeakers to one of the ears of the listener 6, and an impulse response (T'2(n)) which is obtained by controlling the level ratio and the relative time difference of the impulse response, thereby calculating the filter coefficients. Accordingly, it is possible to reduce the change in sound quality of the localized sound image while maintaining the effects of the sound image localization.

EXAMPLE 3

Next, a sound field and sound image control apparatus, and a device and a method for calculating sound image control coefficients in a third example according to the invention will be described.

Figure 8:
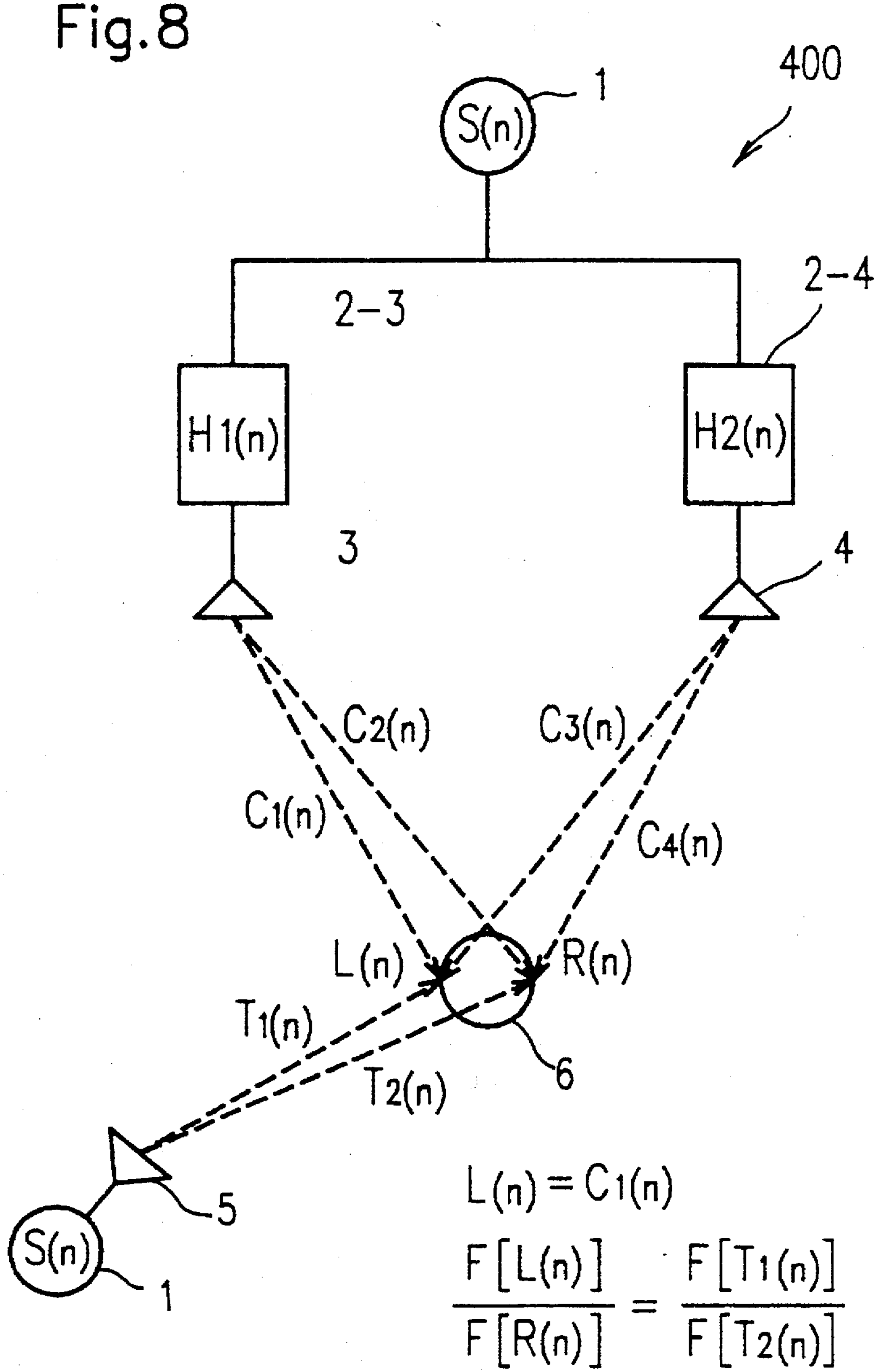
FIG. 8 schematically shows a method for localizing a sound image in the left rear of a listener by a sound field and sound image control apparatus in a third example according to the invention.

FIG. 8 schematically shows a method for localizing a sound image in the left rear of a listener 6 by a sound field and sound image control apparatus 400 in the third example.

In the apparatus 400, sound source signals S(n) generated by a sound source 1 are processed by FIR filters 2-3 and 2-4, and then the processed signals are reproduced from a L-ch reproducing loudspeaker 3 and a R-ch reproducing loudspeaker 4, respectively. For the FIR filter 2-3, filter coefficients H1(n) are set. For the FIR filter 2-4, filter coefficients H2(n) are set. In cases where the apparatus 400 is used for digital processing, an A/D converter and a D/A converter are required. For simplicity, such converters are omitted in the figure. The listener 6 stays at a position distant from the two loudspeakers 3 and 4 by equal distances (i.e., on the center line), and faces the front (i.e., faces toward the middle point between two loudspeakers). The construction of the apparatus 400 is the same as that of the apparatus 100 described in the first example, except for the constructions and the operations of the FIR filters 2-3 and 2-4.

In this example, the audio signals are processed by the FIR filters 2-3 and 2-4 in such a manner that the impulse responses at a position of a first-side ear (i.e., the ear closer to a sound image to be localized) when the audio signals after the convolution process by the FIR filters 2-3 and 2-4 are output from the reproducing loudspeakers 3 and 4 so as to localize a sound image on the first side (left or right) of the listener 6 are made equal to the impulse responses at the position of the first-side ear when the sound source signals are directly output from the loudspeaker located on the first side of the listener 6 without any process.

Also, the FIR filters 2-3 and 2-4 perform the convolution processes so that the difference in transfer characteristics between the ears of the listener 6 when the signals obtained by processing the signals S(n) by the FIR filters 2-3 and 2-4 are output from the reproducing loudspeakers 3 and 4 is made equal to the difference in transfer characteristics between the ears of the listener 6 when the signals S(n) are output from the reference loudspeaker 5.

As in the first example, in FIG. 8, C1(n) indicates an impulse response from the loudspeaker 3 at the position of the left ear of the listener 6. Similarly, C2(n) indicates an impulse response from the L-ch loudspeaker 3 at the position of the right ear of the listener 6, C3(n) indicates an impulse response from the R-ch loudspeaker 4 at the position of the left ear of the listener 6, and C4(n) indicates an impulse response from the R-ch loudspeaker 4 at the position of the right ear of the listener 6. In addition, T1(n) and T2(n) indicate impulse responses from the reference loudspeaker 5 to the left and right ears of the listener 6, respectively. The respective values of C1(n)–C4(n), T1(n) and T2(n) can be obtained by actual measurements or simulation. In addition, a pair of impulse responses from the loudspeakers 3 and 4 to both ears of the listener 6 when the audio signals processed by the FIR filters 2-3 and 2-4 are reproduced from the loudspeakers 3 and 4 are represented by L(n) (the left ear) and R(n) (the right ear).

For example, in order to satisfy the above two conditions when the sound image is to be localized on the left side of the listener 6, the conditions expressed by Equations (6) and (7) below should be established.

$$L(n)=C1(n) \tag{6}$$

$$F[L(n)]/F[R(n)]=F[T1(n)]/F[T2(n)] \tag{7}$$

In the equations, F[ ] denotes a Fourier transform, that is, a transform from a time domain to a frequency domain.

The impulse response R(n) is obtained on the basis of Equations (6) and (7) as follows:

$$R(n)=F^{-1}\{F[C1(n)]\cdot F[T2(n)]/F[T1(n)]\} \tag{8}$$

In the above equation, $F^{-1}\{\ \}$ denotes an inverse Fourier transform, that is, a transform from a frequency domain to a time domain.

The impulse responses L(n) and R(n) satisfy the following conditions expressed by Equations (9) and (10) below.

$$L(n)=H1(n)*C1(n)+H2(n)*C3(n) \tag{9}$$

$$R(n)=H1(n)*C2(n)+H2(n)*C4(n) \tag{10}$$

On the basis of Equations (6) and (8) through (10), the following is obtained:

$$C1(n)=H1(n)*C1(n)+H2(n)*C3(n) \tag{11}$$

$$F^{-1}\{F[C1(n)]\cdot F[T2(n)]/F[T1(n)]\}=H1(n)*C2(n)+H2(n)*C4(n) \tag{12}$$

In this example, for the FIR filters 2-3 and 2-4, the coefficients H1(n) and H2(n) which satisfy the conditions of Equations (11) and (12) are set.

Figure 9:
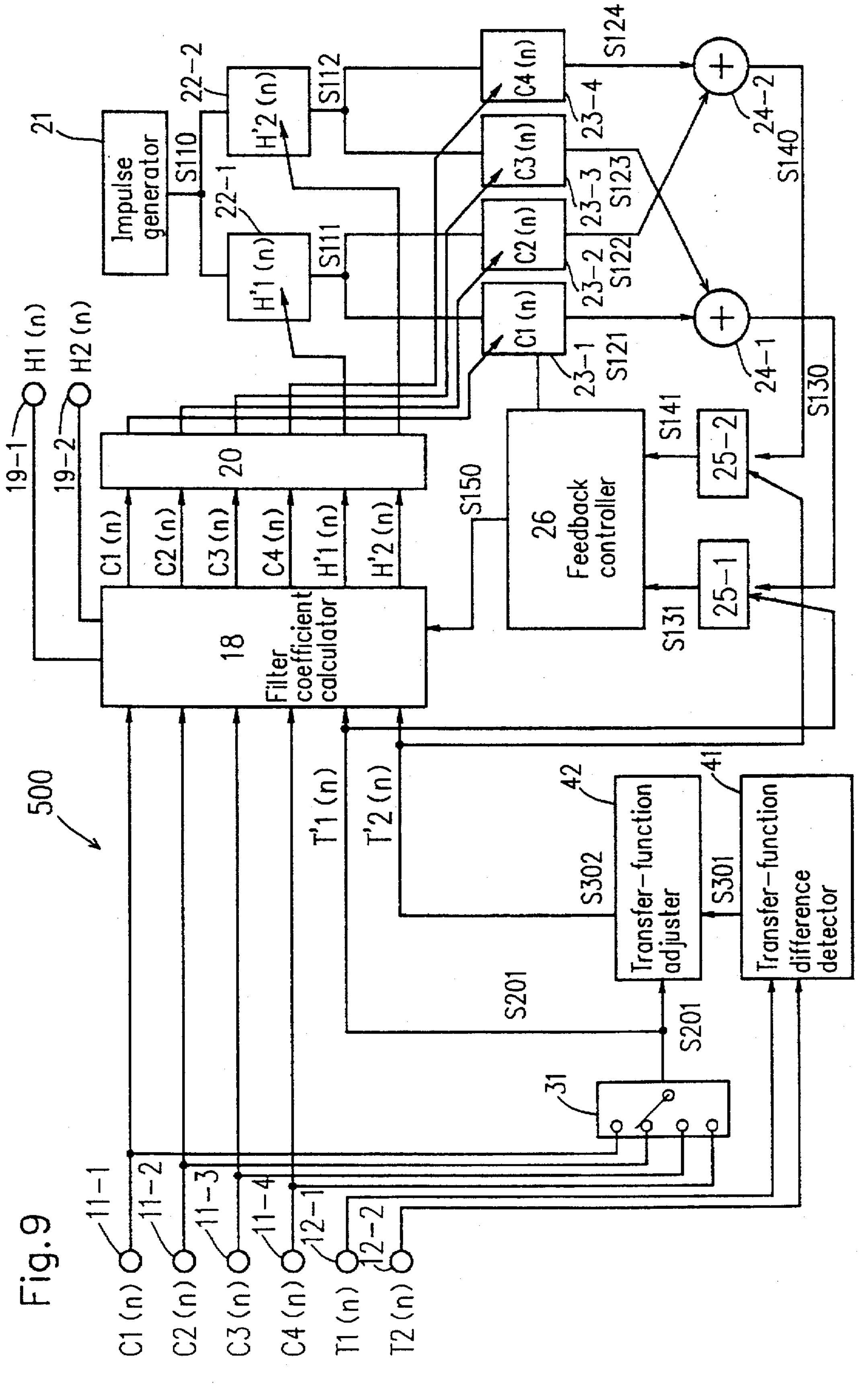
FIG. 9 is a block diagram showing a sound image control coefficient calculating device in the third example.

Next, referring to FIG. 9, a device and a method for calculating the filter coefficients (impulse responses) H1(n) and H2(n) in the sound field and sound image control apparatus 400 of the third example will be described. FIG. 9 is a block diagram showing a sound image control coefficient calculating device 500 in the third example.

Similar to the devices 200 and 300, which are described in the first and second examples, the device 500 includes reproduction-system characteristics input terminals 11-1–11-4, reference characteristics input terminals 12-1 and 12-2, a filter coefficient calculator 18, FIR filters 22-1, 22-2, and 23-1–23-4, a filter coefficient setting device 20, an impulse generator 21, adders 24-1 and 24-2, correlation ratio calculators 25-1 and 25-2, a feedback controller 26, and filter coefficient output terminals 19-1 and 19-2. These components are the same as those in the devices 200 and 300, so that the descriptions thereof are omitted.

The device 500 further includes a transfer characteristic difference detector 41, a transfer characteristic adjuster 42, and a switch 31. The switch 31 is the same as that in the device 300.

Each of the impulse response signals SC1(n)–SC4(n) input through the reproduction-system characteristics input terminals 11-1–11-4 is branched into two signals which are in turn input to the filter coefficient calculator 18 and the switch 31. The switch 31 selects one of the four input impulse response signals and outputs the selected one. The selected impulse response signal S201 is branched into two signals which are applied to the transfer characteristic adjuster 42 and the filter coefficient calculator 18. The impulse response signal S201, applied to the filter coefficient calculator 18, is directly used as the reference characteristic T'1(n) for calculating the filter coefficients.

The impulse response signals ST1(n) and ST2(n) input through the reference characteristics input terminals 12-1 and 12-2 are input into the transfer characteristic difference detector 41. In the transfer characteristic difference detector 41, the transfer characteristics of both of the signals ST1(n) and ST2(n) are calculated, and a ratio of transfer characteristic at each frequency is detected. Specifically, the transfer characteristic ratio on the frequency axis is calculated in accordance with the right side of Equation (7) above. The calculated ratio is output to the transfer characteristic adjuster 42 as a detection signal S301.

The transfer characteristic adjuster 42 performs the operation shown in the left side of Equation (12), based on the impulse response signal S201 applied from the switch 31 and the detection signal S301. The obtained result is output as a signal S302. The signal S302 is applied to the filter coefficient calculator 18, and used as the reference characteristic T'2(n) for calculating the filter coefficients.

Figure 10:
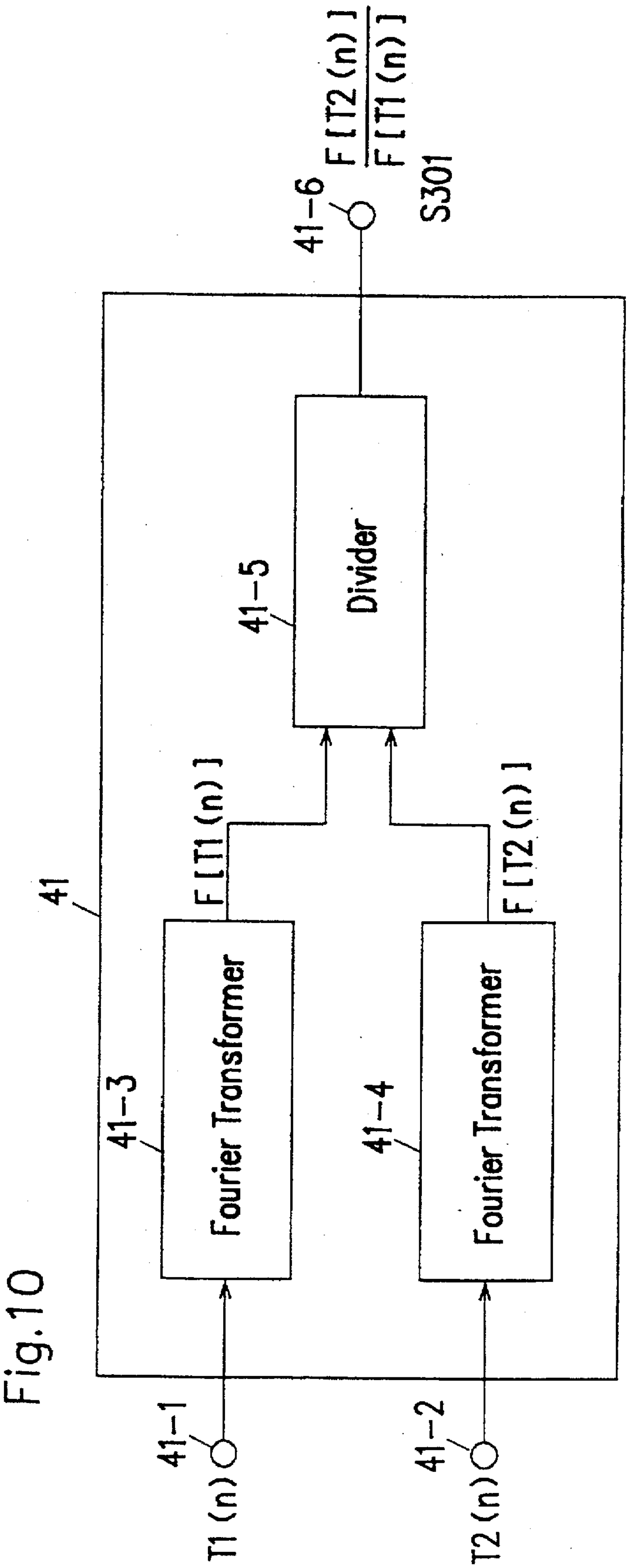
FIG. 10 is a block diagram of an exemplary transfer characteristic difference detector.

FIG. 10 is a block diagram of an example of the transfer characteristic difference detector 41 and a method for detecting the transfer characteristic ratio performed by the transfer characteristic difference detector 41. The transfer characteristic difference detector 41 can be constructed of Fourier transformers 41-3 and 41-4, and a divider 41-5. These circuits can be realized by a conventional technique using a microcomputer or the like.

The impulse response signals ST1(n) and ST2(n), input through input terminals 41-1 and 41-2, are first processed (Fourier transformed) by the Fourier transformers 41-3 and 41-4, respectively. The Fourier transformer 41-3 outputs a signal F[T1(n)] in the frequency domain to the divider 41-5. The Fourier transformer 41-4 outputs a signal F[T2(n)] in the frequency domain to the divider 41-5. In the divider 41-5, the transfer characteristic ratio F[T2(n)]/F[T1(n)] is calculated, and the result is output from an output terminal 41-6 as the signal S301.

Figure 11:
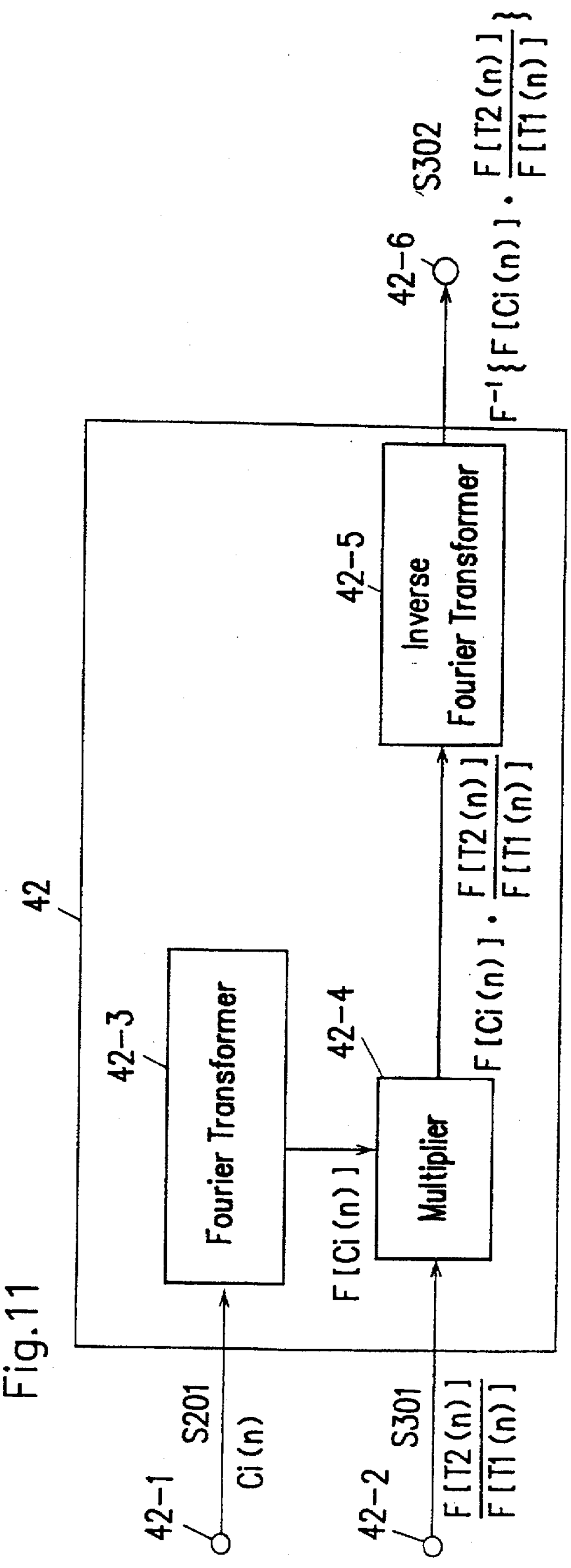
FIG. 11 is a block diagram of an exemplary transfer characteristic adjuster.

FIG. 11 is a block diagram of an example of the transfer characteristic adjuster 42, and a method for adjusting the transfer characteristic performed by the transfer characteristic adjuster 42. The transfer characteristic adjuster 42 can be constructed of a Fourier transformer 42-3, a multiplier 42-4, and an inverse Fourier transformer 42-5. These circuits can be realized by a conventional technique using a microcomputer or the like.

The impulse response signal S201, (Ci(n); i is one of 1–4) input through an input terminal 42-1, is processed (Fourier transformed) by the Fourier transformer 42-3, and then output to the multiplier 42-4 as a signal F[Ci(n)] on the frequency axis. The multiplier 42-4 multiplies the signal F[Ci(n)] by the transfer characteristic ratio F[T2(n)]/F[T1 (n)] based on the signal S301 input through an input terminal 42-2. The multiplication result F[Ci(n)]·F[T2(n)]/F[T1(n)] is output to the inverse Fourier transformer 42-5. The inverse Fourier transformer 42-5 transforms the multiplication result into an impulse response signal $F^{-1}${F[Ci(n)]·F[T2(n)]/F[T1 (n)]} on a time axis. The resulting impulse response signal is output through an output terminal 42-6 as the signal S302.

The impulse response signal S302 output from the transfer characteristic adjuster 42 is input to the filter coefficient calculator 18 as the other reference characteristics signal ST'2(n) for the filter coefficient calculation.

The filter coefficient calculator 18 receives the impulse response signals SC1(n)–SC4(n) applied through the reproduction-system characteristics input terminals 11-1–11-4, the impulse response signal S201 (i.e., the reference characteristics signal ST'1(n)) applied from the switch 31, and the impulse response signal S302 (i.e., ST'2(n)) applied from the transfer characteristic adjuster 42. Based on the impulse responses C1(n)–C4(n), T'1(n), and T'2(n), the filter coefficients H'1(n) and H'2(n) which satisfy the conditions of Equations (11) and (12) are calculated, similar to the devices 200 and 300.

The subsequent signal processes are the same as those in the devices 200 and 300 described in the first and second examples, and the filter coefficients H1(n) and H2(n) are finally output through the output terminals 19-1 and 19-2.

As described above, the sound image is localized on the left side of the listener 6 by realizing the transfer characteristic ratio of impulse response between the left and the right ears of the listener 6 (the difference between transfer characteristics of head-related transfer functions) when the sound source is located on the left side, with the two reproducing loudspeakers 3 and 4. At the same time, the impulse response from the localized sound image to the left ear of the listener 6 is made equal to the impulse response from the L-ch loudspeaker 3 in front of the listener 6 to the left ear of the listener 6, whereby the change in sound quality of the sound image can be minimized.

In the above example, the sound image is localized on the left side of the listener 6. If the sound image is to be localized on the right side of the listener 6, the coefficients H1(n) and H2(n) can be set so as to satisfy the conditions of Equations (13) and (14) below.

$$C4(n)=H1(n)*C2(n)+H2(n)*C4(n) \tag{13}$$

$$F^{-1}\{F[C4(n)]\cdot F[T1(n)]/F[T2(n)]\}=H1(n)*C1(n)+H2(n)*C3(n) \tag{14}$$

As described above, the device 500 in this example does not directly use the impulse responses T1(n) and T2(n) from the reference loudspeaker 5 actually located at a position at which the sound image is to be localized to both ears of the listener 6. The device 500 in this example uses, as the reference characteristics, an impulse response (T'1(n)) from one of the reproducing loudspeakers to one of the ears of the listener 6, and an impulse response (T'2(n)) which is obtained by controlling the transfer characteristic of the impulse response, thereby calculating the filter coefficients. Accordingly, it is possible to reduce the change in sound quality of the localized sound image while maintaining the effects of the sound image localization.

In the first to third examples, cases where the sound image is localized on either side of the listener 6 have been described. Alternatively, if the sound image is to be localized at the rear of the listener 6, the constructions and the processes are the same as in the above cases. In an alternative case where a so-called surround signal is localized on the side of the listener 6 and a main signal is localized forwardly, the sound quality of the surround signal can be made equal to the sound quality of the main signal, by using the apparatus of the invention described in the first to third examples. Thus, it is possible to realize the sound field and sound image reproduction with natural expansion and presence.

EXAMPLE 4

Next, a sound field and sound image control apparatus, and a sound image control method according to a fourth example of the invention will be described. In this example, an apparatus which can provide a plurality of listeners with expansion and presence is described.

Figure 12:
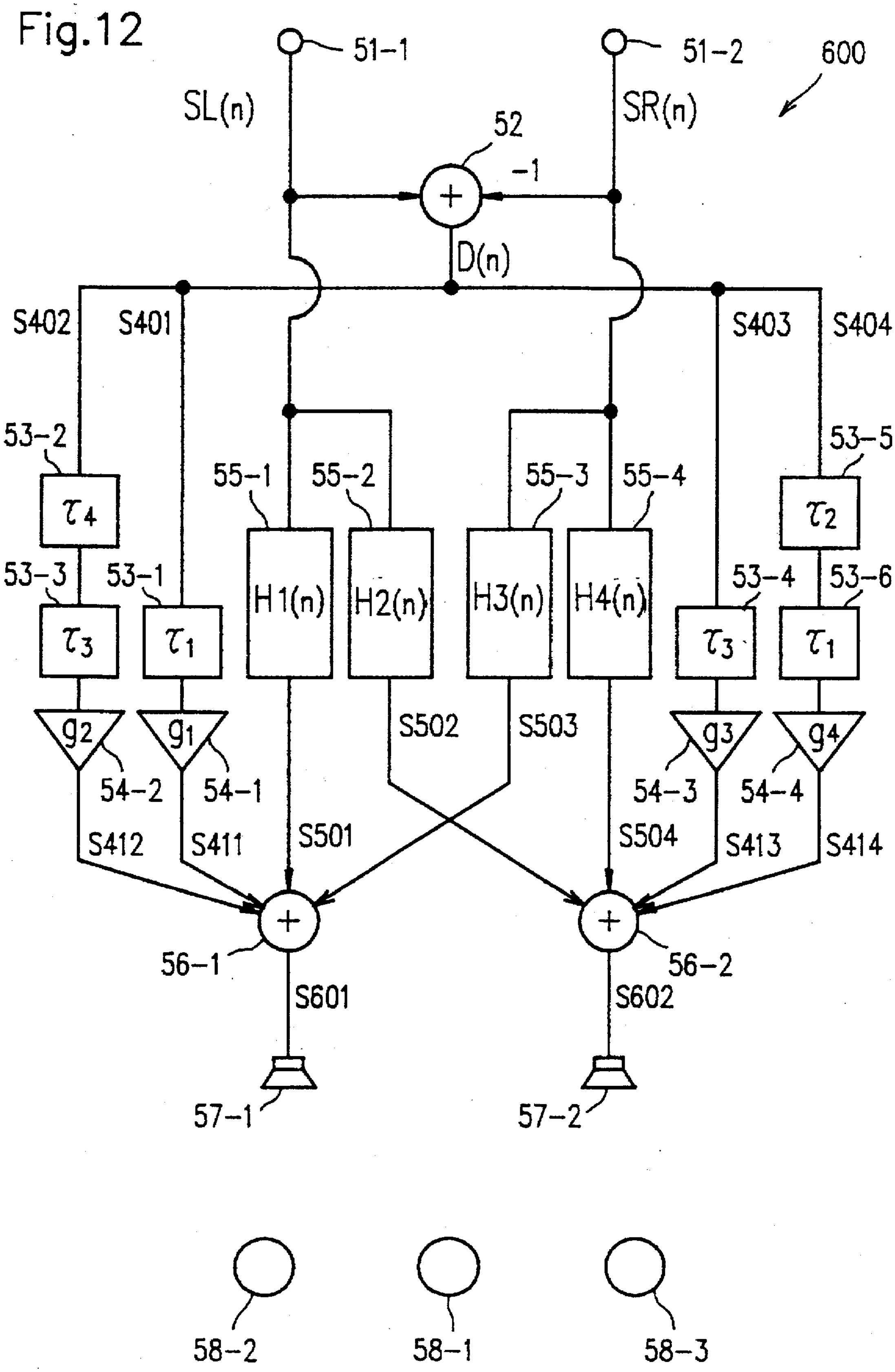
FIG. 12 is a block diagram showing a sound field and sound image control apparatus in a fourth example according to the invention.

FIG. 12 is a block diagram showing the sound field and sound image control apparatus 600 in the fourth example.

The apparatus 600 includes stereo signal input terminals 51-1 and 51-2, a subtracter 52, delay elements 53-1–53-6, multipliers 54-1–54-4, FIR filters 55-1–55-4, adders 56-1 and 56-2, and reproducing loudspeakers 57-1 and 57-2. Through the stereo signal input terminals 51-1 and 51-2, stereo signals SL(n) and SR(n) are input. The subtracter 52 calculates a difference between the stereo signals SL(n) and SR(n), so as to obtain a difference signal D(n). Each of the delay elements 53-1–53-6 receives a corresponding branched difference signal D(n), and delays the signal by a predetermined time. The times delayed by the delay elements 53-1–53-6 are respectively predetermined. The multipliers 54-1–54-4 perform the gain adjustment by multiplying the delayed difference signals D(n) by respective predetermined coefficients (g1–g4). The FIR filters 55-1–55-4 perform the filtering process to the stereo signals SL(n) and SR(n) (the filter coefficients H1(n)–H4(n)). The adders 56-1 and 56-2 add the signals output from the FIR filters 55-1–55-4 and the signals output from the multipliers 54-1–54-4. The reproducing loudspeakers 57-1 and 57-2 reproduce the output signals from the adders 56-1 and 56-2. A first listener 58-1 stays at a center position in front of the two reproducing loudspeakers 57-1 and 57-2. A second listener 58-2 stays on the left side of the first listener 58-1. A third listener 58-3 stays on the right side of the first listener 58-1. Herein, the coefficients g1–g4 used in the multipliers 54-1–54-4 are not limited to positive values. For example, the coefficients g1 and g2 in the multipliers 54-1 and 54-2 for the signals to be reproduced from the L-ch loudspeaker 57-1 may be set so as to be positive values, and the coefficient g3 and g4 in the multipliers 54-3 and 54-4 for the signals to be reproduced from the R-ch loudspeaker 57-2 may be set so as to be negative values. In such a setting, more increased presence can be expected.

The operation of the apparatus 600 with the above construction is now described.

The stereo signal SL(n), input through the stereo signal input terminal 51-1, is branched into two signals, one of which is input to the subtracter 52. The other signal is further branched into two signals which are input to the FIR filters 55-1 and 55-2. Similarly, the stereo signal SR(n), input through the stereo signal input terminal 51-2, is branched into two signals, one of which is input to the subtracter 52. The other signal is further branched into two signals which are input to the FIR filters 55-3 and 55-4. The signals which flow from the stereo signal input terminals 51-1 and 51-2 to the FIR filters 55-1–55-4 are referred to as signals in a first system.

The FIR filters 55-1–55-4 perform the filtering process to the input signals with their filter coefficients H1(n)–H4(n). The processed results from the FIR filters 55-1 and 55-3 are output to the adder 56-1, and the processed results from the FIR filters 55-2 and 55-4 are output to the adder 56-2.

Herein, the filter coefficients H1(n) and H2(n) are set so that the sound image of the signal SL(n) is localized at an expanded position to the left from the position of the L-ch reproducing loudspeaker 57-1 with respect to the first listener 58-1 who stays at the center front position, when the L-ch signal SL(n) is input through the stereo signal input terminal 51-1 and reproduced from the reproducing loudspeakers 57-1 and 57-2. Also, the filter coefficients H3(n) and H4(n) are set so that the sound image of the signal SR(n) is localized at an expanded position to the right from the position of the R-ch reproducing loudspeaker 57-2 with respect to the first listener 58-1, when the R-ch signal SR(n) is input through the stereo signal input terminal 51-2 and reproduced from the reproducing loudspeakers 57-1 and 57-2. The method for localizing the sound image of the signal SL(n) on the left side of the listener by using the FIR filters 55-1 and 55-2 (H1(n) and H2(n)), and the method for localizing the sound image of the signal SR(n) on the right side of the listener by using the FIR filters 55-3 and 55-4 (H3(n) and H4(n)) are the same as those used in the conventional technique.

In this way, the sound image control is performed by using the first-system signals, and the sound images are localized at the expanded positions from the respective reproducing loudspeakers, so that the first listener 58-1 at the center front position can feel greater expansion as compared with the conventional stereo reproduction.

On the other hand, the stereo signals SL(n) and SR(n), which are input through the stereo signal input terminals 51-1 and 51-2 and applied to the subtracter 52, are processed by subtraction in the subtracter 52. The subtracter 52 outputs the difference signal D(n) (=SL(n)–SR(n)). The difference signal D(n) is a signal including reverberation components of the input stereo signals (sometimes referred to as a surround signal), and is used for providing the listener with presence and sound expansion. The output difference signal D(n) is branched into four signals (S401–S404).

Among the four branched signals of the difference signal D(n), the signal S401 is input into the delay element 53-1 where it is delayed by $\tau 1$. The delayed signal S401 is applied to the multiplier 54-1. The multiplier 54-1 multiplies the signal S401 by the coefficient g1 so as to adjust the gain. The resulting signal S411 is output to the adder 56-1. Similarly, the signal S404 is input into the delay element 53-5 where it is delayed by $\tau 2$, and then input into the delay element 53-6 where it is delayed by $\tau 1$. The delayed signal S404 is applied to the multiplier 54-4. The multiplier 54-4 multiplies the delayed signal S404 by a coefficient g4 so as to adjust the gain. The resulting signal S414 is output to the adder 56-2.

Herein, the delay time $\tau 1$ which is common to the two signals (referred to as signals in a second system) is a delay time to delay the second-system signals with respect to the first-system signals which are processed by the FIR filters 55-1–55-4. That is, the second-system signals are reproduced with a time difference from the first-system signals (i.e., delayed by $\tau 1$). The delay time $\tau 1$ can be set to be, for example, about 20 msec.

The delay time $\tau 2$ is set such that, when the second-system signals S411 and S414 are reproduced from the reproducing loudspeakers 57-1 and 57-2, the reproduced signals simultaneously reach the third listener 58-3 who stays at the position shifted to the right from the center. That is, $\tau 2$ is set so as to correct the effects of the difference between distances from the respective reproducing loudspeakers 57-1 and 57-2 to the third listener 58-3 (the difference between the times at which the signals reach the listener and the levels of the signals). Preferably, the value of $\tau 2$ is usually set to be 1 msec. or less.

For example, a time required for the signal S411 reproduced from the loudspeaker 57-1 to reach the third listener 58-3 is represented by $t_1$, and a time required for the signal S414 reproduced from the loudspeaker 57-2 to reach the third listener 58-3 is represented by $t_2$ (where $t_1$ and $t_2$ are assumed to be discrete times). The signal S411 received by the third listener 58-3 is expressed as $\alpha 1 \cdot g1 \cdot D(n-\tau 1-t_1)$, and the signal S414 is expressed as $\beta 1 \cdot g4 \cdot D(n-\tau 1-\tau 2-t_2)$, where $\alpha 1$ and $\beta 1$ denote the attenuation of levels of reached signals depending on the distance.

By setting the delay time $\tau 2$ by the delay element 53-5 so as to satisfy the condition that $\tau 2=t_1-t_2$, and setting the gain g4 of the multiplier 54-4 so as to satisfy the condition that $g4=(\alpha 1/\beta 1)\cdot g1$, the third listener 58-3 can receive the two sounds reproduced from the loudspeakers 57-1 and 57-2 at the equal levels. As a result, the presence and the expansion can be effectively provided for the third listener 58-3 at the position shifted to the right from the center.

Alternatively, the sign of the gain g4 may be inverted from the sign of the gain g1, so that $g4=-(\alpha 1/\beta 1)\cdot g1$. In such a case, the third listener 58-3 receives the difference signal D(n) from the speaker 57-2 in anti-phase. Thus, greater effects can be attained.

Accordingly, although the third listener 58-3 cannot feel the expansion as the result of the sound image control for the first-system signals using the FIR filters 55-1–55-4, the third listener 58-3 can feel spatial expansion by reproducing the second-system difference signal D(n) including reverberation components of the stereo signals.

On the other hand, among the branched signals of the difference signal D(n), the signal S403 is input into the delay element 53-4 where it is delayed by τ3. The delayed signal S403 is applied to the multiplier 54-3. The multiplier 54-3 multiplies the delayed signal S403 by a coefficient g3, so as to adjust the gain. The resulting signal S413 is output to the adder 56-2. Similarly, the signal S402 is input into the delay element 53-2 where it is delayed by τ4, and then input into the delay element 53-3 where it is delayed by τ3. The delayed signal S402 is applied to the multiplier 54-2. The multiplier 54-2 multiplies the delayed signal S402 by a coefficient g2, so as to adjust the gain. The resulting signal S412 is output to the adder 56-1.

Herein, the delay time τ3, which is common to the two signals (referred to as signals in a third system), is a delay time to delay the third-system signals with respect to the first-system signals which are processed by the FIR filters 55-1–55-4. That is, the third-system signals are reproduced with a respective time difference from the first-system and second-system signals (i.e., delayed by τ3 and τ3–τ1).

The delay time τ3 can be set to be, for example, about 30 msec. The delay time τ4 is set such that, when the third-system signals S412 and S413 are reproduced from the reproducing loudspeakers 57-1 and 57-2, the reproduced signals simultaneously reach the second listener 58-2 who stays at the position shifted to the left from the center. That is, τ4 is set so as to correct the effects of the difference between distances from the respective reproducing loudspeakers 57-1 and 57-2 to the second listener 58-2 (the difference between times at which the signals reach the listener and the levels of the signals). Preferably, the value of τ4 is usually set to be 1 msec. or less.

For example, a time required for the signal S412, reproduced from the loudspeaker 57-1 to reach the second listener 58-2, is represented by $t_3$, and a time required for the signal S413, reproduced from the loudspeaker 57-2 to reach the second listener 58-2, is represented by $t_4$ (where, $t_3$ and $t_4$ are assumed to be discrete times). The signal S411 received by the second listener 58-2 is expressed as $\alpha2 \cdot g2 \cdot D(n-\tau3-\tau4-t_3)$, and the signal S413 is expressed as $\beta2 \cdot g3 \cdot D(n-\tau3-t_4)$, where α2 and β2 denote the attenuation of levels of reached signals depending on the distance.

By setting the delay time τ4 by the delay element 53-2 so as to satisfy the condition that $\tau3=t_4-t_3$, and setting the gain g2 of the multiplier 54-2 so as to satisfy the condition that $g2=(\beta2/\alpha2)\cdot g3$, the second listener 58-2 can receive the two sounds reproduced from the loudspeakers 57-1 and 57-2 at the equal levels. As a result, the presence and the expansion can be effectively provided for the second listener 58-2 at the position shifted to the left from the center.

Alternatively, the sign of the gain g2 may be inverted from the sign of the gain g3, so that $g2=-(\beta2/\alpha2)\cdot g3$. In such a case, the second listener 58-2 receives the difference signal D(n) from the speaker 57-1 in anti-phase. Thus, greater effects can be attained.

Accordingly, although the second listener 58-2 cannot feel the expansion as the result of the sound image control for the first-system signals using the FIR filters 55-1–55-4, the second listener 58-2 can feel spatial expansion by reproducing the third-system difference signal D(n) including reverberation components of the stereo signals.

The respective signals are added by the adders 56-1 and 56-2 in the following manner, and reproduced from the loudspeakers 57-1 and 57-2. The adder 56-1 adds the output signals S501 and S503 from the FIR filters 55-1 and 55-3 and the output signals S411 and S412 from the multipliers 54-1 and 54-2, so as to output the added signal S601. The added signal S601 is reproduced from the reproducing loudspeaker 57-1. Similarly, the adder 56-2 adds the output signals S502 and S504 from the FIR filters 55-2 and 55-4, and the output signals S413 and S414 from the multipliers 54-3 and 54-4, so as to output the added signal S602. The added signal S602 is reproduced from the reproducing loudspeaker 57-2.

By adjusting the ratio of addition in the adders 56-1 and 56-2, it is possible to determine which one of the listeners 58-1–58-3 can receive the sound in the best condition. For example, if the signals S412 and S413 are added at a larger ratio, the deterioration of the optimal sound for the second listener 58-2 can be reduced. The signals by which the second listener 58-2 can receive the sound in the best condition are the signals which are localized forwardly for the first and third listeners 58-1 and 58-3. Similarly, the optimal signals for the first listener 58-1 are the signals which are localized forwardly for the second and third listeners 58-2 and 58-3, and the optical signals for the third listener 58-3 are the signals which are localized forwardly for the first and second listeners 58-1 and 58-2.

As described above, according to this example, even in the case where there are three listeners, all of the listeners can feel expansion and presence. Specifically, the sound image control using the FIR filtering process is adopted for the listener at the center position, and the reproduction by delaying the difference signal including reverberation components is adopted for the listeners at the left and right positions, whereby offering the expansion and presence to all of the listeners.

In general, the difference signals D(n) of the stereo audio signals include, as large components, reverberation sound and sounds which are not required to be clearly localized at the center of the reproducing loudspeakers. By causing such difference signals D(n) to be received in anti-phase, the listeners can obtain a vague expansion feeling without clearly localized position of the sound image and a feeling surrounded by reverberation sound. In general, if the listeners receive only the sound in anti-phase, the listeners may have a strange feeling due to the sound anti-phased too strongly. However, according to the invention, the respective listeners receive normal-phased sounds as well as sounds in anti-phase, so that the listeners can naturally feel expansion and presence.

In this example, the difference signal is branched into four signals for the case where two listeners stay at off-center positions. The present invention is not limited to this specific case. Alternatively, the difference signal may be branched into five or more signals for the case where two or more listeners stay at off-center positions. In such a case, the delay and multiplication processes may perform in the same way as those described above.

In this example, two reproducing loudspeakers are used. In another case where three or more reproducing loudspeakers are used, a pair of loudspeakers may be used for a listener so as to localize the sound image at the expanded position from the loudspeakers, and another pair of loudspeakers may be used for another listener so as to output the difference signal of the stereo audio signals in anti-phase.

In this example, the filter coefficients are determined so as to localize the sound image at the expanded position from the reproducing loudspeakers with respect to the first listener. The present invention is not limited to such determination. Alternatively, the filter coefficients may be determined so as to localize the sound image in front of or in the rear of the first listener.

EXAMPLE 5

Next, a sound field and sound image control apparatus, and a sound image control method according to a fifth example of the invention will be described. This example describes an apparatus which provides expansion and presence for a plurality of listeners and which can improve the clarity of speech when input signals include speech signals.

Figure 13:
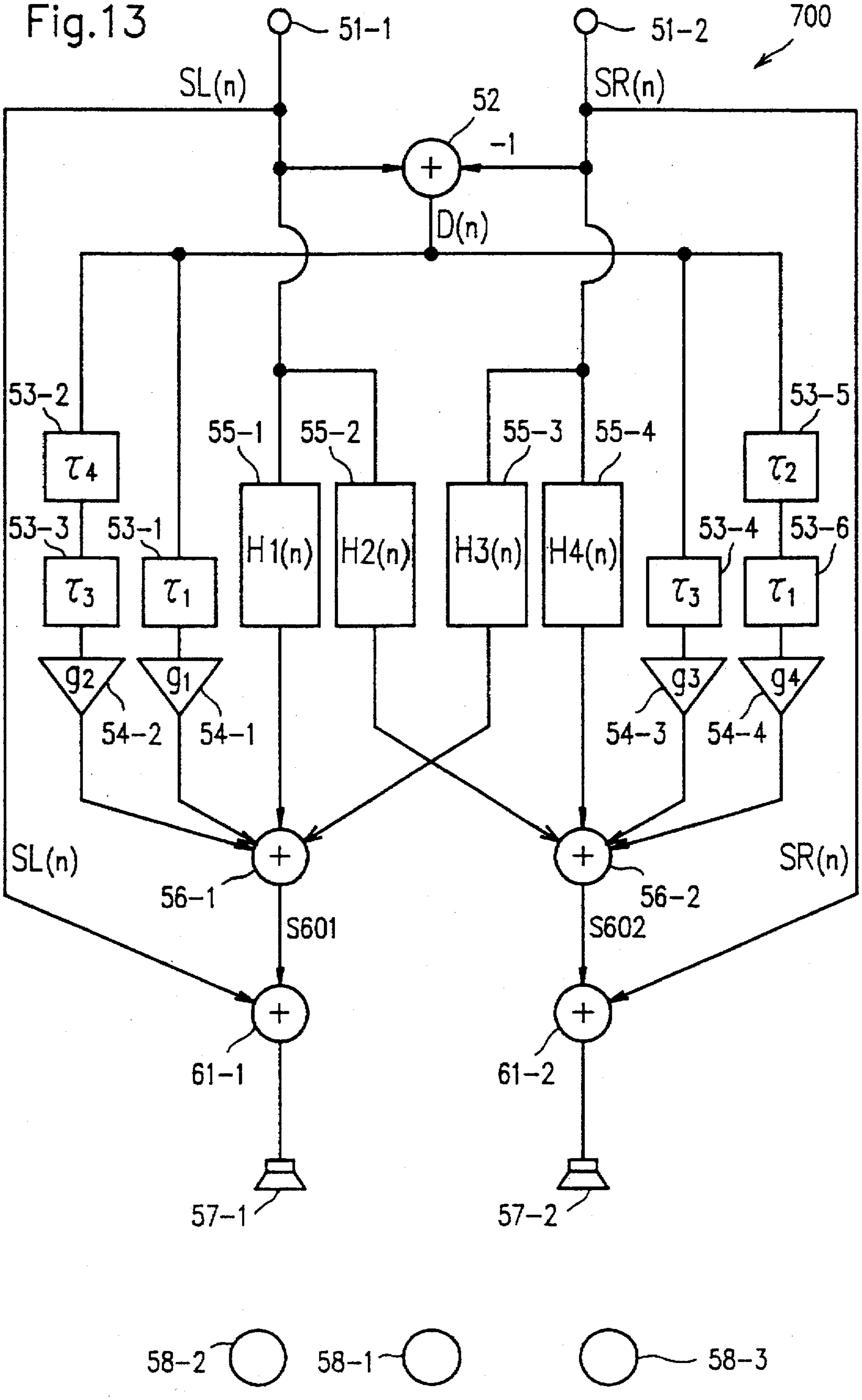
FIG. 13 is a block diagram showing a sound field and sound image control apparatus in a fifth example according to the invention.
Figure 14:
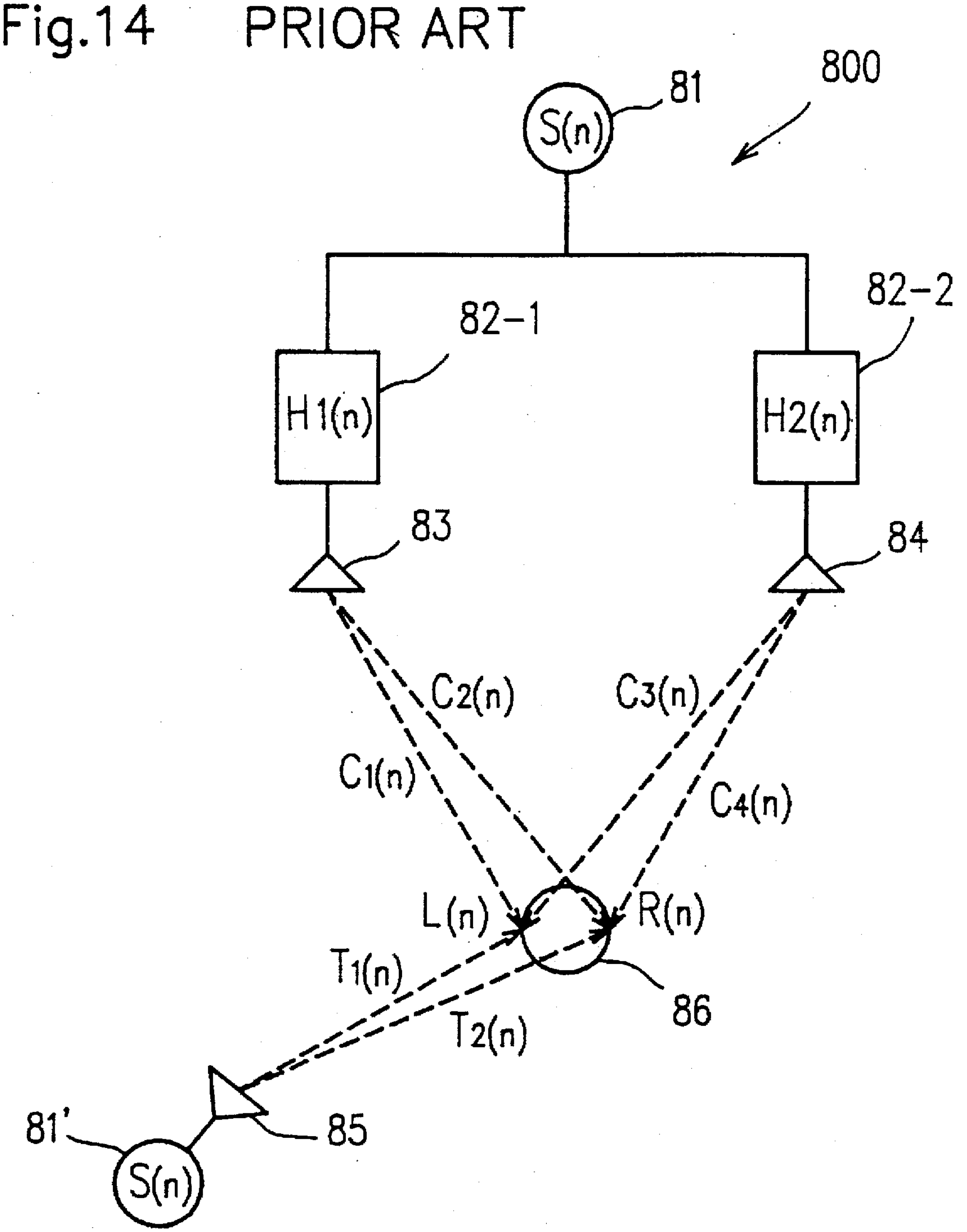
Fig.14 PRIOR ART
FIG. 14 schematically shows an exemplary construction of a conventional sound field and sound image control apparatus and a filter coefficient calculating method for localizing the sound image in the left rear of a listener.
Figure 15:
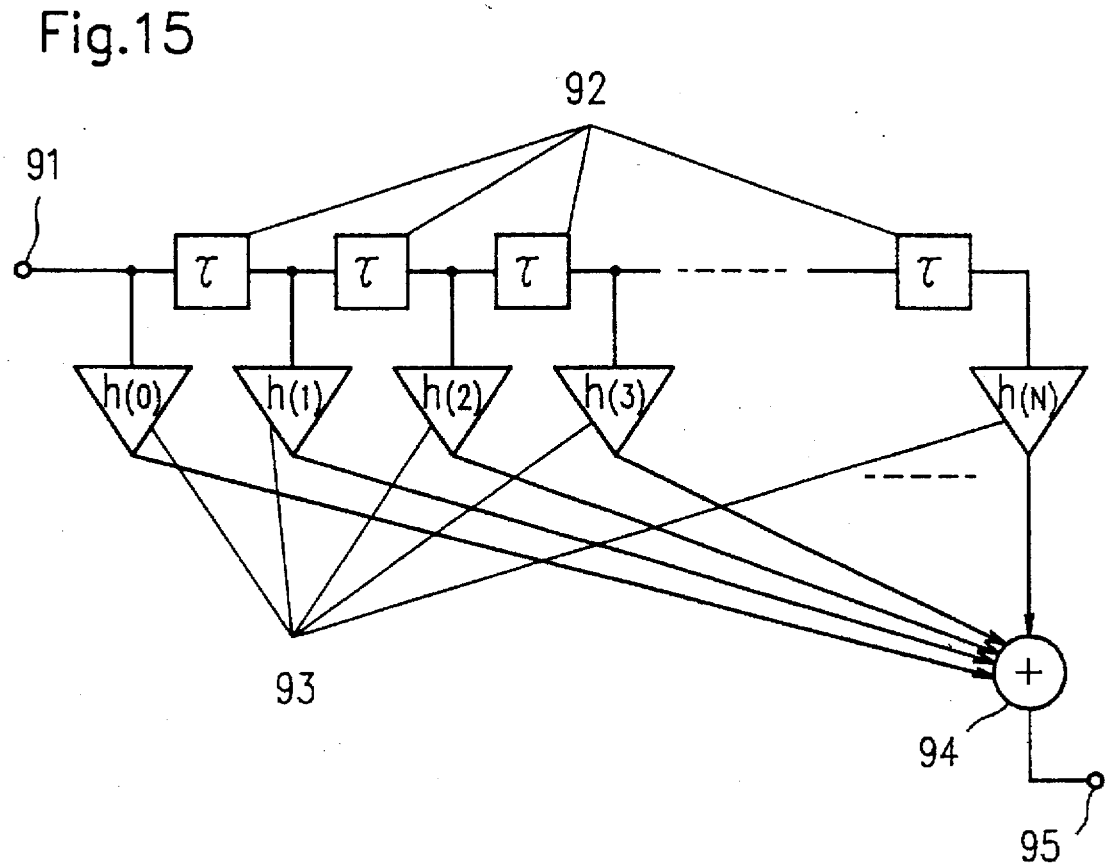
FIG. 15 is a block diagram showing a basic construction of an FIR filter.
Figure 16:
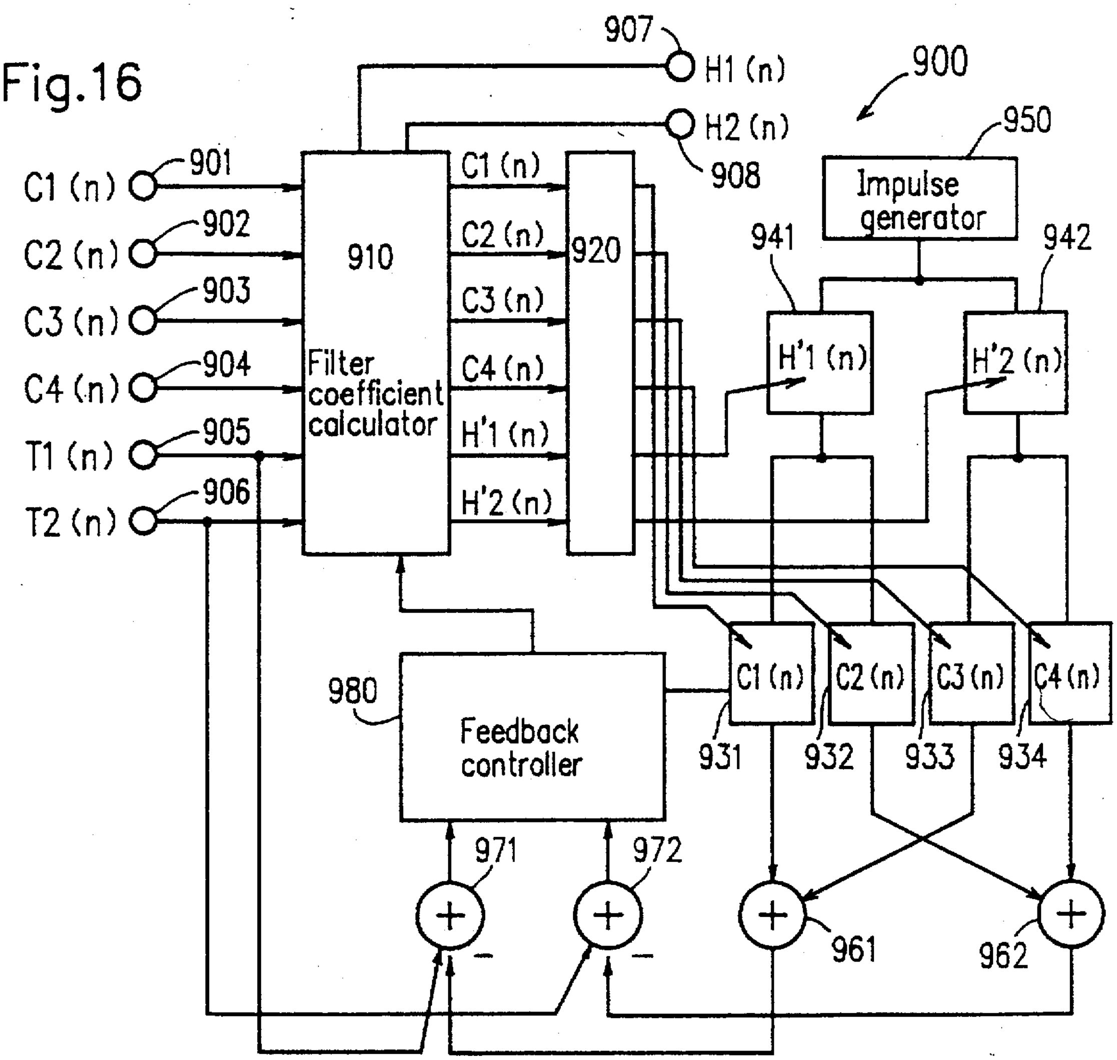
FIG. 16 is a block diagram showing a conventional exemplary filter coefficient calculating device for sound image localization.

FIG. 13 is a block diagram showing the sound field and sound image control apparatus 700 in the fifth example.

The apparatus 700 includes stereo signal input terminals 51-1 and 51-2, a subtracter 52, delay elements 53-1–53-6, multipliers 54-1–54-4, FIR filters 55-1–55-4, adders 56-1 and 56-2, and reproducing loudspeakers 57-1 and 57-2. Through the stereo signal input terminals 51-1 and 51-2, stereo signals SL(n) and SR(n) are input. The subtracter 52 calculates a difference between the stereo signals SL(n) and SR(n), so as to obtain a difference signal D(n). Each of the delay elements 53-1–53-6 receives a corresponding branched difference signal D(n), and delays the signal by a predetermined time. The times delayed by the delay elements 53-1–53-6 are respectively predetermined. The multipliers 54-1–54-4 perform the gain adjustment by multiplying the delayed difference signals D(n) by respective predetermined coefficients (g1–g4). The FIR filters 55-1–55-4 perform the filtering process to the stereo signals SL(n) and SR(n) (the filter coefficients H1(n)–H4(n)). The adders 56-1 and 56-2 add the outputs from the FIR filters 55-1–55-4 and the outputs from the multipliers 54-1–54-4. The reproducing loudspeakers 57-1 and 57-2 reproduce the output signals from the adders 56-1 and 56-2.

The apparatus 700 further includes direct sound adders 61-1 and 61-2 for adding the stereo signals SL(n) and SR(n) input through the stereo signal input terminals 51-1 and 51-2 to the output signal S601 of the adder 56-1 and the output signal S602 of the adder 56-2, respectively.

As in the fourth example, a first listener 58-1 stays at a center position in front of the two reproducing loudspeakers 57-1 and 57-2. A second listener 58-2 stays on the left side of the first listener 58-1. A third listener 58-3 stays on the right side of the first listener 58-1.

In the apparatus 700 with the above construction, the output signal S601 of the adder 56-1 and the stereo signal SL(n) are added by the direct sound adder 61-1 which is connected to the output of the adder 56-1, and then reproduced from the reproducing loudspeaker 57-1. Also, the output signal S602 of the adder 56-2 and the stereo signal SR(n) are added by the direct sound adder 61-2 which is connected to the output of the adder 56-2, and then reproduced from the reproducing loudspeaker 57-2.

The remaining operations are the same as those described in the fourth example shown in FIG. 12.

According to the apparatus 700 of this example, the reproduction is performed by adding the direct sound to the signals S601 and S602 which are processed for the sound image control and the presence creation, whereby the clarity of speech can be improved while the expansion and presence are maintained.

As described above, according to the sound field and sound image control apparatus of the invention, the reproduction with expansion for the listener positioned at the center is provided by localizing the sound image at a position other than the positions of the reproducing loudspeakers, and the reproduction with expansion for the listeners at positions shifted from the center is provided by outputting difference signals of the stereo audio signals. Therefore, the listener's positions are not limited in the center of the sound field and sound image control apparatus, and the audio reproduction with expansion can be performed in a wide service area.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus which calculates filter coefficients for controlling sound field, comprising:

an input for receiving a plurality of first impulse response signals and a pair of second impulse response signals, the plurality of first impulse response signals indicating impulse responses from reproduction loudspeakers reproducing audio signals to both ears of a listener, the pair of second impulse response signals indicating impulse responses from a reference loudspeaker to both ears of the listener, the reference loudspeaker being located at a separate position from the reproduction loudspeakers;

feature extracting means for receiving the pair of second impulse response signals, for extracting parameters from the second impulse response signals, the parameters representing features of the pair of second impulse response signals, and for outputting parameter signals;

signal adjusting means for adjusting at least one of the plurality of first impulse response signals based on the parameter signals, and for outputting a pair of third impulse response signals having the same features as the extracted features; and coefficient calculation means for calculating the filter coefficients for controlling the sound field, based on the plurality of first impulse response signals, and the pair of third impulse response signals applied from the signal adjusting means, whereby an output of the reproduction speakers applied to the listener creates an effect of a localized sound image so that the listener perceives the sound image at the position of the reference loudspeaker.

2. An apparatus according to claim 1, wherein the feature extracting means comprises:

level ratio detection means for receiving the pair of second impulse response signals, for detecting a level ratio $\alpha$ of the pair of second impulse response signals, and for outputting a level ratio detection signal; and time difference detection means for receiving the pair of second impulse response signals, for detecting a time difference dt of the pair of second impulse response signals, and for outputting a time difference detection signal.

3. A method for calculating filter coefficients for controlling sound field and sound image, comprising the steps of:

receiving a plurality of first impulse response signals and a pair of second impulse response signals, the plurality of first impulse response signals indicating impulse responses from reproduction loudspeakers reproducing audio signals to both ears of a listener, the pair of second impulse response signals indicating impulse responses from a reference loudspeaker to both ears of the listener, the reference loudspeaker being located at a separate position from the reproduction loudspeakers;

(a) extracting features of the pair of second impulse response signals, and producing a parameter signals representing the features;

(b) adjusting at least one of the plurality of first impulse response signals based on the parameter signals, and producing a pair of third impulse response signals having the same features as the extracted features; and (c) calculating the filter coefficients for controlling the sound field and sound image, based on the plurality of first impulse response signals, and the produced pair of third impulse response signals, whereby an output of the reproduction speakers applied to the listener creates an effect of a localized sound image so that the listener perceives the sound image at the position of the reference loudspeaker.

4. A method according to claim 3, wherein step (a) comprises the steps of:

(a1) detecting a level ratio α of the pair of second impulse response signals, and producing a level ratio detection signal; and (a2) detecting a time difference dt of the pair of second impulse response signals, and producing a time difference detection signal.

5. An apparatus which calculates filter coefficients for controlling sound field and sound image, based on a plurality of first impulse response signals and a pair of second impulse response signals, the plurality of first impulse response signals indicating impulse responses from loudspeakers reproducing audio signals to both ears of a listener, the pair of second impulse response signals indicating impulse responses from a reference loudspeaker at a position at which a sound image is localized to both ears of the listener, the apparatus comprising:

feature extracting means for receiving the pair of second impulse response signals, for extracting parameters from the second impulse response signals, the parameters representing features of the pair of second impulse response signals, and for outputting parameter signals;

signal adjusting means for adjusting at least one of the plurality of first impulse response signals based on the parameter signals, and for outputting a pair of third impulse response signals having the same features as the extracted features; and coefficient calculation means for calculating the filter coefficients for controlling the sound field and sound image, based on the plurality of first impulse response signals and the pair of third impulse response signals applied from the signal adjusting means;

wherein the coefficient calculation means sets the filter coefficients so that the pair of third impulse response signals are substantially equal to a pair of fourth impulse response signals indicating a pair of impulse responses at both ears of the listener when impulse signals are reproduced from the reproducing loudspeakers.

6. An apparatus according to claim 5, further comprising:

response characteristic calculation means for calculating a pair of impulse responses at both ears of the listener when the impulse signals are reproduced from the reproducing loudspeakers, based on the first impulse response signals and the filter coefficients, and for outputting the pair of fourth impulse response signals;

comparison means for comparing the pair of fourth impulse response signals with the pair of third impulse response signals, and for outputting a correlation signal; and control means for outputting a control signal which controls the coefficient calculation means, based on the correlation signal, wherein, in accordance with the control signal, the coefficient calculation means selectively performs one of two operations, in one operation signals indicative of the calculated filter coefficients are output, and in the other operation the filter coefficients are again calculated using signals which are obtained by delaying the pair of third impulse response signals by a predetermined time.

7. An apparatus according to claim 5, wherein the feature extracting means comprises:

level ratio detection means for receiving the pair of second impulse response signals, for detecting a level ratio α of the pair of second impulse response signals, and for outputting a level ratio detection signal; and time difference detection means for receiving the pair of second impulse response signals, for detecting a time difference dt of the pair of second impulse response signals, and for outputting a time difference detection signal, and wherein the signal adjusting means comprises:

selecting means for selecting a pair of first impulse response signals from among the plurality of first impulse response signals;

time difference adjusting means for receiving the selected pair of first impulse response signals and the time difference detection signal, for adjusting the selected pair of first impulse response signals so that a relative time difference of the pair of first impulse response signals is equal to the time difference dt based on the time difference detection signal, and for outputting a pair of adjusted impulse response signals; and level ratio adjusting means for receiving the pair of adjusted impulse response signals and the level ratio detection signal, for adjusting a gain of the pair of the adjusted impulse response signals so that the level ratio of the adjusted impulse response signals in the pair is equal to the level ratio α based on the level ratio detection signal, and for outputting the pair of gain-adjusted signals as the pair of third impulse response signals.

8. An apparatus according to claim 5, wherein the feature extracting means comprises:

level ratio detection means for receiving the pair of second impulse response signals, for detecting a level ratio α of the pair of second impulse response signals, and for outputting a level ratio detection signal; and time difference detection means for receiving the pair of second impulse response signals, for detecting a time difference dt of the pair of second impulse response signals, and for outputting a time difference detection signal, and wherein the signal adjusting means comprises:

selecting means for selecting one first impulse response signal from among the plurality of first impulse response signals;

time difference adjusting means for receiving the selected first impulse response signal and the time difference detection signal, for delaying the selected first impulse response signal by the time difference dt based on the time difference detection signal, and for outputting a delayed impulse response signal; and level ratio adjusting means for receiving the delayed impulse response signal and the level ratio detection signal, for adjusting a gain of the delayed impulse response signal by multiplication of the delayed impulse response signal by the level ratio α based on the level ratio detection signal, and for outputting an adjusted impulse response signal, and wherein the pair of third impulse response signals are constituted of the selected first impulse response signal and the adjusted impulse response signal.

9. An apparatus according to claim 5, wherein the feature extracting means is transfer characteristic detection means for receiving the pair of second impulse response signals, for detecting transfer characteristics of the pair of second impulse response signals, for calculating a transfer characteristic ratio, and for outputting a characteristic ratio signal.

10. An apparatus according to claim 9, wherein the signal adjusting means comprises:

selecting means for selecting one first impulse response signal from among the plurality of first impulse response signals; and transfer characteristic adjusting means for receiving the selected first impulse response signal and the characteristic ratio signal, for adjusting a transfer characteristic of the selected first impulse response signal based on the characteristic ratio, and for outputting an adjusted impulse response signal, and wherein the pair of third impulse response signals are constituted of the selected first impulse response signal and the adjusted impulse response signal.

11. An apparatus according to claim 10, wherein the transfer characteristic detection means comprises: first transform means for transforming the received pair of second impulse response signals into a pair of first characteristic signals represented in frequency domain; and first calculation means for calculating a transfer characteristic ratio of the pair of second impulse response signals based on the first characteristic signals, and the transfer characteristic adjusting means comprises: second transform means for transforming the selected first impulse response signal into a second characteristic signal represented in frequency domain; second calculation means for multiplying the second characteristic signal by the transfer characteristic ratio indicated by the characteristic ratio signal; and inverse transform means for transforming the multiplied signal into a signal represented in time domain.

12. An apparatus according to claim 11, wherein the first and second transform means are Fourier transform means, and the inverse transform means is inverse Fourier transform means.

13. A method for calculating filter coefficients for controlling sound field and sound image, based on a plurality of first impulse response signals and a pair of second impulse response signals, the plurality of first impulse response signals indicating impulse responses from loudspeakers reproducing audio signals to both ears of a listener, the pair of second impulse response signals indicating impulse responses from a reference loudspeaker at a position at which a sound image is localized to both ears of the listener, the method comprising the steps of:

(a) extracting features of the pair of second impulse response signals and producing parameter signals representing the features;

(b) adjusting at least one of the plurality of first impulse response signals based on the parameter signals and producing a pair of third impulse response signals having the same features as the extracted features; and (c) calculating the filter coefficients for controlling the sound field and sound image, based on the plurality of first impulse response signals and the produced pair of third impulse response signals, wherein the filter coefficients are set so that the pair of third impulse response signals are substantially equal to a pair of fourth impulse response signals indicating a pair of impulse responses at both ears of the listener when impulse signals are reproduced from the reproducing loudspeakers.

14. A method according to claim 13, further comprising the steps of:

(d) calculating a pair of impulse responses at both ears of the listener when the impulse signals are reproduced from the reproducing loudspeakers, based on the first impulse response signals and the filter coefficients, and producing the pair of fourth impulse response signals;

(e) comparing the pair of fourth impulse response signals with the pair of third impulse response signals, and producing a correlation signal; and (f) producing a control signal which controls the coefficient calculation, based on the correlation signal, wherein, in the step (c), in accordance with the control signal, one of step (c1) of producing signals indicative of outputting the calculated filter coefficients and step (c2) of calculating again the filter coefficients using signals which are obtained by delaying the pair of third impulse response signals by a predetermined time.

15. A method for calculating filter coefficients for controlling sound field and sound image, based on a plurality of first impulse response signals and a pair of second impulse response signals, the plurality of first impulse response signals indicating impulse responses from loudspeakers reproducing audio signals to both ears of a listener, the pair of second impulse response signals indicating impulse responses from a reference loudspeaker at a position at which a sound image is localized to both ears of the listener, the method comprising the steps of:

(a) extracting features of the pair of second impulse response signals and producing parameter signals representing the features, said step further including the steps of:

(a1) detecting a level ratio α of the pair of second impulse response signals, and producing a level ratio detection signal; and (a2) detecting a time difference dt of the pair of second impulse response signals, and producing a time difference detection signal;

(b) adjusting at least one of the plurality of first impulse response signals based on the parameter signals and producing a pair of third impulse response signals having the same features as the extracted features, said step further comprising the steps of:

(b1) selecting one pair of first impulse response signals from among the plurality of first impulse response signals;

(b2) adjusting the pair of first impulse response signals so that a relative time difference of the pair of first impulse response signals is equal to the time difference dt based on the time difference detection signal, and producing a pair of adjusted impulse response signals; and (b3) adjusting a gain of the pair of the adjusted impulse signals so that the level ratio of the adjusted impulse response signals in the pair is equal to the level ratio α based on the level ratio detection signal, and producing the pair of gain-adjusted signals as the pair of third impulse response signals; and (c) calculating the filter coefficients for controlling the sound field and sound image, based on the plurality of first impulse response signals and the produced pair of third impulse response signals.

16. A method for calculating filter coefficients for controlling sound field and sound image, based on a plurality of first impulse response signals and a pair of second impulse response signals, the plurality of first impulse response signals indicating impulse responses from loudspeakers reproducing audio signals to both ears of a listener, the pair of second impulse response signals indicating impulse responses from a reference loudspeaker at a position at which a sound image is localized to both ears of the listener, the method comprising the steps of:

(a) extracting features of the pair of second impulse response signals and producing parameter signals representing the features, said step further including the steps of:

(a1) detecting a level ratio α of the pair of second impulse response signals, and producing a level ratio detection signal; and (a2) detecting a time difference dt of the pair of second impulse response signals, and producing a time difference detection signal;

(b) adjusting at least one of the plurality of first impulse response signals based on the parameter signals and producing a pair of third impulse response signals having the same features as the extracted features, said step further comprising the steps of:

(b4) selecting one first impulse response signal from among the plurality of first impulse response signals;

(b5) delaying the selected first impulse response signal by the time difference dt based on the time difference detection signal, and producing a delayed impulse response signal; and (b6) adjusting a gain of the delayed impulse response signal by multiplying the delayed impulse response signal by the level ratio α based on the level ratio detection signal, and producing an adjusted impulse response signal, wherein the pair of third impulse response signals are constituted of the selected first impulse response signal and the adjusted impulse response signal; and (c) calculating the filter coefficients for controlling the sound field and sound image, based on the plurality of first impulse response signals and the produced pair of third impulse response signals.

17. A method for calculating filter coefficients for controlling sound field and sound image, based on a plurality of first impulse response signals and a pair of second impulse response signals, the plurality of first impulse response signals indicating impulse responses from loudspeakers reproducing audio signals to both ears of a listener, the pair of second impulse response signals indicating impulse responses from a reference loudspeaker at a position at which a sound image is localized to both ears of the listener, the method comprising the steps of:

(a) extracting features of the pair of second impulse response signals and producing parameter signals representing the features, said step further including the steps of:

(a3) detecting transfer characteristics of the pair of second impulse response signals, and (a4) calculating a transfer characteristic ratio, and producing a characteristic ratio signal;

(b) adjusting at least one of the plurality of first impulse response signals based on the parameter signals and producing a pair of third impulse response signals having the same features as the extracted features; and (c) calculating the filter coefficients for controlling the sound field and sound image, based on the plurality of first impulse response signals and the produced pair of third impulse response signals.

18. A method according to claim 17, wherein step (b) comprises the steps of:

(b7) selecting one first impulse response signal from among the plurality of first impulse response signals; and (b8) adjusting a transfer characteristic of the selected first impulse response signal based on the characteristic ratio, and producing an adjusted impulse response signal, and wherein the pair of third impulse response signals are constituted of the selected first impulse response signal and the adjusted impulse response signal.

19. A method according to claim 18, wherein step (a3) comprises: a first transform step of transforming the received pair of second impulse response signals into a pair of first characteristic signals represented in frequency domain; and a first calculation step of calculating a transfer characteristic ratio of the pair of second impulse response signals based on the first characteristic signals, and step (b8) comprises: a second transform step of transforming the selected first impulse response signal into a second characteristic signal represented in frequency domain; a second calculation step of multiplying the second characteristic signal by the transfer characteristic ratio indicated by the characteristic ratio signal; and an inverse transform step of transforming the multiplied signal into a signal represented in time domain.

20. A method according to claim 19, wherein in the first and second transform steps, Fourier transforms are performed, and in the inverse transform step, an inverse Fourier transform is performed.

* * * * *

UNITED STATES PATENT AND TRADE MARK OFFICE

CERTIFICATE OF CORRECTION

PATENT NO. : 5,684,881
DATED : November 4, 1997
INVENTOR(S) : Serikawa et al.

It is certified that error appears in the above-identified patent and that said Letters Patent is hereby corrected as shown below:

On the cover page, item [56] References Cited, Foreign Patent Documents, "406121306A" should be --406121396A--.

Signed and Sealed this

Twentieth Day of October, 1998

Attest:

BRUCE LEHMAN

*Attesting Officer* *Commissioner of Patents and Trademarks*